(12) United States Patent
Babich et al.

(10) Patent No.: US 11,929,829 B2
(45) Date of Patent: Mar. 12, 2024

(54) LOW-LATENCY, LOW-OVERHEAD DATA FRAMING METHOD FOR CAPACITY-LIMITED DELAY-SENSITIVE LONG DISTANCE COMMUNICATION

(71) Applicant: Skywave Networks LLC, Chicago, IL (US)

(72) Inventors: Kevin J. Babich, Valparaiso, IN (US); Terry Lee Vishloff, Anmore (CA); Danie J. van Wyk, Pretoria (ZA)

(73) Assignee: Skywave Networks LLC, Chicago, IL (US)

( * ) Notice: Subject to any disclaimer, the term of this patent is extended or adjusted under 35 U.S.C. 154(b) by 0 days.

(21) Appl. No.: 17/659,563

(22) Filed: Apr. 18, 2022

(65) Prior Publication Data
US 2023/0078971 A1 Mar. 16, 2023

Related U.S. Application Data

(63) Continuation of application No. 15/929,164, filed on Nov. 14, 2019, now Pat. No. 11,309,996.
(Continued)

(51) Int. Cl.
*H04L 12/26* (2006.01)
*H04L 1/00* (2006.01)
(Continued)

(52) U.S. Cl.
CPC .......... *H04L 1/0063* (2013.01); *H04L 1/0057* (2013.01); *H04L 1/0059* (2013.01); *H04L 43/0847* (2013.01); *G06Q 20/16* (2013.01)

(58) Field of Classification Search
CPC ... H04L 1/0063; H04L 1/0057; H04L 1/0059; H04L 43/0847; H04L 1/24; H04L 1/00; G06Q 20/16
See application file for complete search history.

(56) References Cited

U.S. PATENT DOCUMENTS 5,612,956 A   3/1997   Walker et al.
6,061,343 A   5/2000   son Akerberg
(Continued)

FOREIGN PATENT DOCUMENTS

WO   2015147825 A1   10/2015
WO   2015185726 A2   12/2015
WO   2017031469 A1   2/2017

OTHER PUBLICATIONS

Arikan, Toros, Thesis—Minimum-Delay HF Communications, University of Illinois at Urbana-Champaign Retrieved from the Internet: https://www.ideals.illinois.edu/bitstream/handle/2142/97507/ARIKAN-THESIS-2017.pdf?sequence=1, 60 pages, Nov. 28, 2017.
(Continued)

*Primary Examiner* — Jay P Patel
(74) *Attorney, Agent, or Firm* — Woodard, Emhardt, Henry, Reeves & Wagner, LLP

(57) ABSTRACT

A communication method is configured to increase speed of messages reception over a bandwidth limited channel such as high frequency (HF) radio. User data arriving from a high-speed network is transformed into a format suitable for transmission over the radio channel. Message packets that will take longer to reach a destination via the radio channel as compared to alternative channels, such as a fiber optic network, are rejected for radio transmission. When the packet is received, the receiver deduces message length by using information from various error handling techniques, such as forward error correction (FEC) and cyclic redundancy check (CRC) techniques. Fill data is transmitted between message packets when no data is available. The FEC and CRC information for the fill data is modified so that the fill data will fail FEC and CRC checks at the receiving station.

23 Claims, 11 Drawing Sheets

Related U.S. Application Data

(60) Provisional application No. 62/767,196, filed on Nov. 14, 2018.

(51) Int. Cl.
*H04L 43/0823* (2022.01)
*G06Q 20/16* (2012.01)

(56) References Cited

U.S. PATENT DOCUMENTS

| | | | |
|---|---|---|---|
| 6,404,776 | B1 | 6/2002 | Augustin et al. |
| 7,251,282 | B2 | 7/2007 | Maltsev et al. |
| 7,343,540 | B2 | 3/2008 | Khermosh et al. |
| 7,924,950 | B2 | 4/2011 | Chen et al. |
| 8,862,961 | B2 * | 10/2014 | Zhang ............... H03M 13/6331 714/755 |
| 9,136,938 | B1 | 9/2015 | Babich |
| 9,622,255 | B2 | 4/2017 | Padden et al. |
| 10,349,234 | B1 | 7/2019 | Rivkin |
| 10,805,933 | B2 | 10/2020 | Stephens et al. |
| 2006/0039302 | A1 | 2/2006 | Sturrock et al. |
| 2008/0130560 | A1 | 6/2008 | Khandekar et al. |
| 2009/0190677 | A1 * | 7/2009 | Jokela ................... H04L 5/0053 375/260 |
| 2011/0078545 | A1 | 3/2011 | He et al. |
| 2013/0028271 | A1 * | 1/2013 | Limberg ................. H04L 1/005 370/479 |
| 2014/0082448 | A1 * | 3/2014 | Zhang ............... H03M 13/6343 714/E11.002 |
| 2014/0086588 | A1 | 3/2014 | Kawanishi et al. |
| 2014/0281085 | A1 | 9/2014 | Ebert |
| 2015/0172000 | A1 | 6/2015 | Alliot |
| 2015/0318956 | A1 | 11/2015 | Choo et al. |
| 2016/0218947 | A1 | 7/2016 | Hughes et al. |
| 2017/0223712 | A1 | 8/2017 | Stephens et al. |
| 2019/0121350 | A1 | 4/2019 | Cella et al. |
| 2019/0182807 | A1 * | 6/2019 | Panteleev ............ H04L 1/0068 |
| 2019/0274070 | A1 | 9/2019 | Hughes et al. |
| 2019/0379485 | A1 | 12/2019 | Jiang et al. |
| 2020/0244352 | A1 | 7/2020 | Babich |
| 2020/0328841 | A1 | 10/2020 | Babich et al. |
| 2020/0328844 | A1 * | 10/2020 | Babich ................. H04L 1/0061 |
| 2020/0328918 | A1 * | 10/2020 | Babich ................. H04L 1/0003 |
| 2020/0328919 | A1 | 10/2020 | Babich et al. |
| 2020/0366367 | A1 | 11/2020 | Babich |
| 2021/0037535 | A1 | 2/2021 | Stephens et al. |
| 2021/0058150 | A1 | 2/2021 | Babich |
| 2021/0058151 | A1 | 2/2021 | Babich |
| 2021/0067239 | A1 | 3/2021 | Babich |
| 2021/0075494 | A1 | 3/2021 | Babich |
| 2021/0075502 | A1 | 3/2021 | Babich |
| 2021/0075562 | A1 | 3/2021 | Babich |
| 2021/0075584 | A1 | 3/2021 | Babich |
| 2021/0099251 | A1 * | 4/2021 | Podlozhnyuk ..... H03M 13/1137 |
| 2021/0105044 | A1 | 4/2021 | Babich |
| 2021/0105806 | A1 | 4/2021 | Ahn et al. |
| 2022/0110181 | A1 * | 4/2022 | Miao ..................... H04L 1/1822 |
| 2022/0200729 | A1 * | 6/2022 | Frenzel ................ H04L 1/1812 |

OTHER PUBLICATIONS

PCT, Intl. App. No. PCT/US2019/070009 Written Opinion of the International Searching Authority, 12 pages, dated Mar. 10, 2020.
PCT, Intl. App. No. PCT/US2019/070009 International Search Report, 5 pages, dated Mar. 10, 2020.
PCT, Int. App. No. PCT/US2019/070009 International Preliminary Report on Patentability, 13 pages, dated May 18, 2021.
Robertson, A generalized frame synchronizer, Proceedings of the global telecommunications conference Globecom. IEEE published online Aug. 6, 2002, 5 pages, Dec. 6, 1992.
EP, European Application No. EP19885551.2 Extended European Search Report, 13 pages, dated Oct. 17, 2022.

* cited by examiner

LOW-LATENCY, LOW-OVERHEAD DATA FRAMING METHOD FOR CAPACITY-LIMITED DELAY-SENSITIVE LONG DISTANCE COMMUNICATION

CROSS REFERENCE TO RELATED APPLICATIONS

This application is a continuation of U.S. patent application Ser. No. 15/929,164, filed Nov. 14, 2019, which is hereby incorporated by reference. U.S. patent application Ser. No. 15/929,164, filed Nov. 14, 2019, claims the benefit of U.S. Patent Application No. 62/767,196, filed Nov. 14, 2018, which are hereby incorporated by reference.

BACKGROUND

Typical over the air (OTA) radio transmissions can have significant latencies when transmitted over long distances such as across oceans. Moreover, these transmission channels can be rather noisy which in turn increases the need for error correction. High frequency (HF) radio communication channels of most long-distance communication systems are limited by the available assigned radio bandwidth and channel capacity at any given time. When using the HF radio channel in a financial high-frequency trading application, this limited bandwidth can cause delays in the receipt of financial instructions which in turn can be financially detrimental.

Thus, there is a need for improvement in this field.

SUMMARY

In a radio or any communication system, there is a need to detect the start and end of a new message so that data can be correctly decoded. The usual solutions add overhead data which reduce the fraction of the radio spectrum available for useful information. It has been found that this overhead adds delay and jitter.

For example, earlier methods required adding unique words to a transmitted message. Unique words are data patterns that are not expected in data messages. Unique words are common in communications systems with one byte (e.g., 07EH) being a common start and end of frame limiter in packet communications. These unique words are used to tell a receiver where data is located. Placement of these unique words is usually at the beginning and/or ending of the message, but the unique words may be embedded in other locations of the message, or even scattered within the message. It was found that these unique words consume system capacity and add delay to the message.

Framing structures have also been proposed. In a framing structure approach, a regular structure is transmitted with specific locations for known data patterns (i.e., the framing overhead), system management messages, error correction, and user data. The amount of framing overhead required varies with the dynamic nature of a communication channel. In stable systems, such as traditional time-division multiplexing (TDM) telephony, the framing overhead is small. Once the frame of a TDM message is locked, the TDM message tends to stay locked. In wireless systems, due to the dynamic nature of a radio channel, as experienced in mobile and HF systems, robust framing is required. This robust framing results in a large amount of overhead in the message. It has been found that this fixed framing approach consumes system capacity and adds a variable delay to the message which is known as jitter. The jitter arises as messages arrive at a system input at varying intervals. As a result, the system has to wait a variable time before a data slot is available for message transport.

With low-latency communications, it is desirable to be able to start and receive messages as soon as possible without waiting for byte or other framing alignment. For example, high-frequency trading as well as other time sensitive activities needs minimal delay from end-to-end. Consequently, communications in these environments should have as little overhead in the transmitted message, and the message transmission process should have the smallest latency or delay as possible. Packets, which may contain trading instructions, should begin transmission with minimum delay.

In light of this, a unique communication method or technique has been developed to facilitate minimal, or no, transmit queuing delay, and this method has the capability to support asynchronous packet arrivals and transmissions over the air. Generally speaking, this method transforms user data arriving from a high-speed communication link into a format suitable for transmission over a much slower radio channel. Packet transmission time over the radio channel is typically longer than on the high speed link. This results in the need to reject packets at the transmitter if the packets will be delayed by any transmit queue beyond what is useful for the trading application. Packets that will take longer to reach a destination via the radio channel as compared to alternative channels, such as a high-speed fiber optic network, are rejected for transmission over the radio channel.

Fill data is generally transmitted when no user data is available for transmission. The fill data produces an idle sequence for the radio receiver to maintain lock onto the transmitted waveform. The fill data may be interrupted at any time without consequence to system performance. However, the fill data rarely may be incorrectly identified at a receiving station as being a legitimate. To avoid this false packet detection, the fill data in one example is pre-processed at the transmission station. In one example, the transmitted message along with the fill data are processed using forward error correction (FEC) and cyclic redundancy check (CRC) schemes. However, the FEC and CRC information for the fill data is modified so that the fill data will fail FEC and CRC checks at the receiving station. At the receiving station, the FEC and CRC checks allow the receiving station to identify messages and decode those messages.

Among other things, this technique is able to handle variable inter-packet timing issues, and at the same time, this technique provides low communication delays. The method is used for detecting the start of a message on a wireless channel with minimal overhead, latency and jitter. This method also supports asynchronous transmissions that are neither byte nor frame aligned. Using this method, message transmission may commence at any transmitted symbol boundary, because the fill data used during idles period can be interrupted without consequence.

This encoding and decoding technique does not add overhead for framing words. It should be appreciated that framing words reduce the utility of the radio channel by consuming radio spectrum. Moreover, this method adds minimal jitter and latency as compared to systems using fixed framing structures or special symbol sets that typically need to be pre-pended to, appended to, or inserted into a data message. With this method, changing modulation techniques, packet lengths, and/or error correction techniques does not require adjustments in a frame structure. Instead the receiver determines message boundaries solely or mostly by using FEC and CRC. Additionally, changing modulation techniques, packet lengths, and/or error correction techniques does not require significant message padding in order to achieve framing alignment. The padding is limited to only that required to build any integer number of symbols. For practical modulation schemes, the number of padding bits is relatively small. The packets can be transmitted on any symbol boundary, rather than waiting for byte, word, or frame alignment as the fill data can be interrupted without penalty.

The system and techniques as described and illustrated herein concern a number of unique and inventive aspects. Some, but by no means all, of these unique aspects are summarized below.

Aspect 1 generally concerns a method that includes receiving a message from a primary communication channel at a receiving station.

Aspect 2 generally concerns the method of any previous aspect which further includes detecting a message boundary of the through a parity check code in combination with an error correction scheme.

Aspect 3 generally concerns the method of any previous aspect in which the message has an integer number of modulated symbols.

Aspect 4 generally concerns the method of any previous aspect in which the primary communication channel includes a low bandwidth, low latency communication link.

Aspect 5 generally concerns the method of any previous aspect in which the primary communication channel includes a high frequency radio channel.

Aspect 6 generally concerns the method of any previous aspect which further includes receiving the message through a message data stream that includes user data and fill data.

Aspect 7 generally concerns the method of any previous aspect in which the user data is encoded in an asynchronous manner in the message data stream.

Aspect 8 generally concerns the method of any previous aspect which further includes maintaining a signal lock on the message data stream through the fill data.

Aspect 9 generally concerns the method of any previous aspect in which the fill data includes a pseudorandom binary sequence (PRBS).

Aspect 10 generally concerns the method of any previous aspect in which the fill data includes a version of the PRBS modified by the parity check code and the error correction scheme.

Aspect 11 generally concerns the method of any previous aspect which further includes detecting a false message with the version of the PRBS.

Aspect 12 generally concerns the method of any previous aspect in which the version of the PRBS has been modified to fail a parity check code test.

Aspect 13 generally concerns the method of any previous aspect in which the version of the PRBS has been modified to fail an error correction scheme test.

Aspect 14 generally concerns the method of any previous aspect in which the parity check code includes a checksum.

Aspect 15 generally concerns the method of any previous aspect in which the parity check code includes a cyclic redundancy check (CRC).

Aspect 16 generally concerns the method of any previous aspect in which the error correction scheme includes forward error correction (FEC).

Aspect 17 generally concerns the method of any previous aspect in which the error correction scheme includes a convolution code scheme.

Aspect 18 generally concerns the method of any previous aspect in which the error correction scheme includes a tail-biting Viterbi decoding algorithm.

Aspect 19 generally concerns the method of any previous aspect in which the error correction scheme includes a block code scheme.

Aspect 20 generally concerns the method of any previous aspect in which the error correction scheme includes a turbo block code scheme.

Aspect 21 generally concerns the method of any previous aspect which further includes encoding a message data stream with user data and fill data.

Aspect 22 generally concerns the method of any previous aspect which further includes modifying the fill data to reduce a chance of false message detection.

Aspect 23 generally concerns the method of any previous aspect which further includes encoding the message data stream with a parity check code in combination with an error correction scheme.

Aspect 24 generally concerns the method of any previous aspect which further includes creating a modified version of the fill data in which the modified version fails a test for the parity check code.

Aspect 25 generally concerns the method of any previous aspect which further includes creating a modified version of the fill data in which the modified version fails a test for the error correction scheme.

Aspect 26 generally concerns the method of any previous aspect which further includes transmitting the message data stream from a transmission station.

Aspect 27 generally concerns the method of any previous aspect which further includes receiving a user data packet from a high speed network at a transmission station.

Aspect 28 generally concerns the method of any previous aspect which further includes calculating a message transmission time for the user data packet across a primary communication channel.

Aspect 29 generally concerns the method of any previous aspect which further includes calculating an inter-message transmission time between user data packets from the high speed network.

Aspect 30 generally concerns the method of any previous aspect which further includes determining whether to transmit the user data packet over the primary communication channel at least based on the message transmission time and the inter-message transmission time.

Aspect 31 generally concerns the method of any previous aspect which further includes accepting the user data packet for transmission over a primary communication channel when a message transmission time is less than or equal to an inter-message transmission time.

Aspect 32 generally concerns the method of any previous aspect which further includes transmitting a message including the user data across the primary communication channel.

Aspect 33 generally concerns the method of any previous aspect which further includes rejecting the user data packet for transmission over a primary communication channel when a message transmission time plus its waiting time in a queue, due to completion of transmissions in progress, will result in a message reception time for the new message exceeding an acceptable time limit.

Aspect 34 generally concerns the method of any previous aspect which further includes transmitting a message including the user data across a backend communication channel.

Aspect 35 generally concerns the method of any previous aspect in which the user data packet concerns a transaction for a financial instrument.

Aspect 36 generally concerns a method for message start and stop boundary detection for use on a radio channel utilizing a redundancy parity check code in combination with a forward error correction (FEC) scheme where messages may arrive in an asynchronous manner with the only constraint being an integer number of modulated symbols in each message.

Aspect 37 generally concerns the method of any previous aspect in which the parity check code is cyclic redundancy check (CRC) and the FEC scheme uses a tail-biting Viterbi decoding algorithm of a convolution code.

Aspect 38 generally concerns the method of any previous aspect in which the application is for high-speed financial instrument trading.

Aspect 39 generally concerns the method of any previous aspect in which the error correction code is a block code.

Aspect 40 generally concerns the method of any previous aspect in which the error correction code is a Turbo block code.

Aspect 41 generally concerns the method of any previous aspect in which the period between messages is occupied with fill data, where such fill data is designed to be unlikely to cause false message detection at the receiver.

Aspect 42 generally concerns a system for performing the method of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
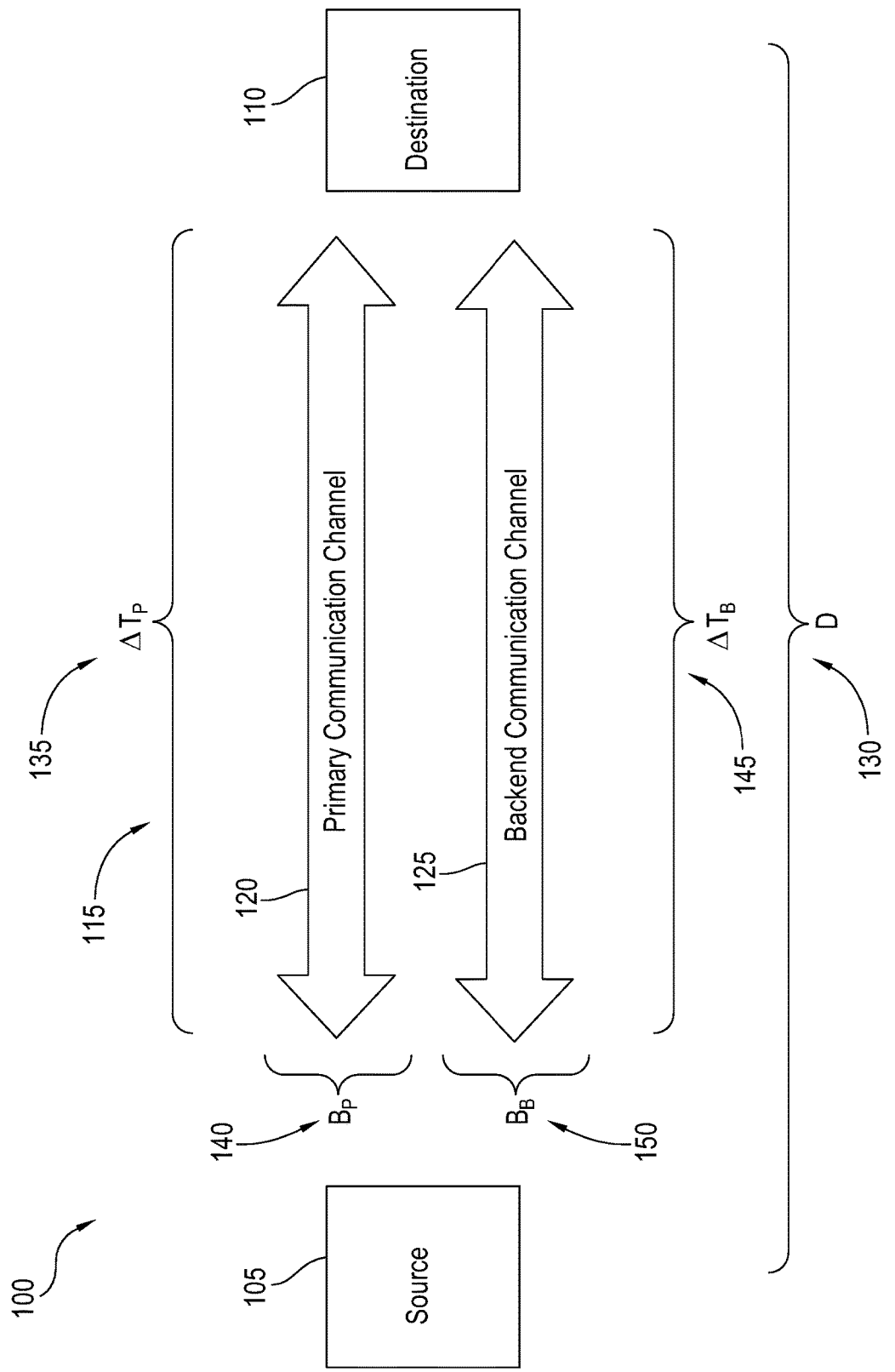
FIG. 1 is a diagrammatic view of a communication system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a generic version of a communication system 100 according to one example. As shown, the communication system 100 includes an information source 105 and an information destination 110. The information source 105 and information destination 110 operatively communicate with one another through one or more communication channels 115. Communication over these communication channels 115 can be one-way type communications and/or two-way type communications. In the illustrated example, the communication channels 115 between the information source 105 and information destination 110 include a primary communication channel 120 and a backend communication channel 125. In other examples, the communication system 100 can include just a single communication channel 115 or more than two communication channels 115.

As will be explained in further detail below, the communication system 100 can be used in a number of situations, especially in situations where the information source 105 and information destination 110 are located physically remote from one another. The communication system 100 for instance can be used for private, commercial, medical, military, and/or governmental purposes. For the purposes of explanation, the communication system 100 will be described for use with a financial trading system, but it should be recognized that the communication system 100 can be adapted for other uses such as for issuing military commands and performing remote telemedicine procedures. In this example, the information source 105 and information destination 110 generally represent the locations of the computer systems for remotely located stock/commodity exchanges and/or financial institutions that trade on those exchanges. Some examples of these exchanges include the New York Stock Exchange (NYSE), the NASDAQ Stock Market, Tokyo Stock Exchange (TYO), the Shanghai Stock Exchange, the Hong Kong Stock Exchange, Euronext, London Stock Exchange, Shenzhen Stock Exchange, Toronto Stock Exchange, Bombay Stock Exchange, Chicago Mercantile Exchange (CME), Chicago Board of Trade (CBOT), and the New York Mercantile Exchange (NYMEX), just to name a few.

As shown in FIG. 1, the information source 105 and information destination 110 are physically separated by a distance ("D") 130. For instance, the exchanges represented by the information source 105 and information destination 110 can be separated by mountains, continents, and even oceans. This physical distance 130 creates a delay or latency in communications between the information source 105 and information destination 110 locations. Normally, but not always, the greater the distance 130, the longer the latency for a given communication channel 115. In most cases, the distance 130 between these exchanges prevents direct line of sight communications which further increases latency as well as increases the risk for communication errors. For instance, the information destination 110 can be located past the radio horizon for the information source 105. With trading as well as other activities, time and communication accuracy are crucial. Any delays can cause traders to lose money, and likewise, any communication errors can cause a loss. Communication errors can be reduced but usually at the cost of higher latency and/or greater bandwidth requirements. Most communication channels 115 have limited bandwidth to some degree. The latency and bandwidth capabilities can vary depending on the construction and type of communication channel 115.

As can be seen, the primary communication channel 120 has a primary channel latency ($\Delta T_P$) 135 and a primary channel bandwidth ($B_P$) 140. The backend channel latency 145 primary communication channel 120 has a backend channel latency ($\Delta T_B$) 145 and a backend channel bandwidth ($B_B$) 150. The communication channels 115 in FIG. 1 can have the same latency and bandwidth properties or different latency and/or bandwidth as well as other properties. In one example, the primary channel latency 135 of the primary communication channel 120 is less than the backend channel latency 145 of the backend communication channel 125, and the primary channel bandwidth 140 of the primary communication channel 120 is less than the backend channel bandwidth 150 of the backend communication channel 125. In some variations of this example, the primary communication channel 120 is a wireless communication channel (e.g., radio), and the backend communication channel 125 is a wired type communication channel (e.g., fiber optic cable). In one particular form, the primary communication channel 120 uses a skywave communication technique, and the backend communication channel 125 includes a non-skywave path such as a fiber optic cable. In other examples, the primary communication channel 120 and backend communication channel 125 represent different communication channels 115 for the same type of communication mode. For instance, primary communication channel 120 and backend communication channel 125 represent wireless communication channels having different frequency bands, and in one example, both communication channels 115 utilize high frequency (HF) radio to communicate via skywave propagation. With the primary communication channel 120 and backend communication channel 125 having different frequencies, the primary communication channel 120 and backend communication channel 125 can have different latencies, bandwidths, and/or communication error rates. For instance, the primary communication channel 120 in one situation can be noisier than the backend communication channel 125, but the primary communication channel 120 can have a shorter latency than the backend communication channel 125.

The HF radio communication channel 115 of the communication system 100 can be limited by the available assigned radio bandwidth and channel capacity at any given time. When using the HF radio communication channel 115 in a financial high frequency trading application, increasing the number and/or transmission speed of messages increases the profit potential of the communication system 100. As will be further explained below, a unique method has been developed to reduce the latency of messages sent over a bandwidth-limited wireless communication channel 115. In addition to decreasing latency, the reduced overhead of this technique results in a higher number of transactions per unit of time can be communicated and/or executed.

Figure 2:
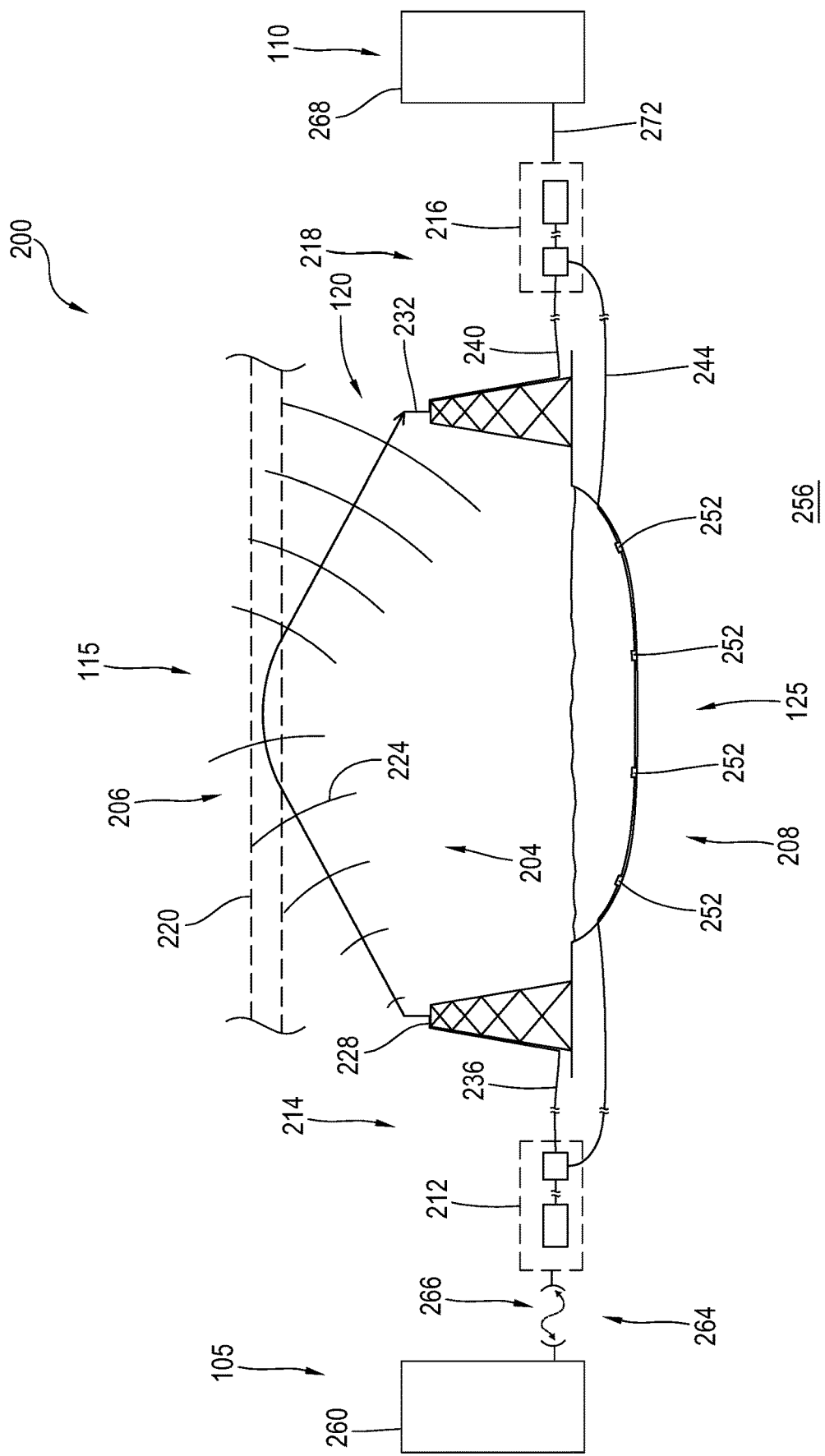
FIG. 2 is a diagrammatic view of a communication system according to another example.

FIG. 2 illustrates a specific example of a communication system 200 of the FIG. 1 communication system 100 configured to transfer data according to the unique technique described herein. Like in the FIG. 1 communication system 100, the communication system 200 in FIG. 2 includes the information source 105, information destination 110, and communication channels 115 that include the primary communication channel 120 and backend communication channel 125. Specifically, the communication system 200 in FIG. 2 is configured to transfer data via a low latency, low bandwidth communication link 204. In one form, the low latency, low bandwidth communication link 204 includes a high frequency radio channel ("HF radio") 206. The communication system 200 in FIG. 2 is further configured to transfer data via a separate data via a high latency, high bandwidth communication link 208. The low latency, low bandwidth communication link 204 and high latency, high bandwidth communication link 208 provide separate connections between a first communication node 212 at a transmission station 214 and a second communication node 216 at a receiving station 218. The low latency, low bandwidth communication link 204 may be configured to transmit data using electromagnetic waves 224 passing through free space via skywave propagation between a transmitting antenna 228 and a receiving antenna 232. The electromagnetic waves 224 may be generated by a transmitter in the first communication node 212, passed along a transmission line 236 to the transmitting antenna 228. The electromagnetic waves 224 may be radiated by the transmitting antenna 228 encountering an ionized portion of the atmosphere 220. This radiated electromagnetic energy may then be refracted by the ionized portion of the atmosphere 220 causing the electromagnetic waves 224 to redirect toward the earth 256. The electromagnetic waves 224 may be received by the receiving antenna 232 coupled to the second communication node 216 by the transmission line 240. As illustrated in FIG. 2, a transmitting communication node may use skywave propagation to transmit electromagnetic energy long distances across the surface of the earth 256 without the need of one or more transmission lines 236 to carry the electromagnetic energy.

Data may also be transmitted between the transmission station 214 and receiving station 218 using the high latency, high bandwidth communication link 208. As illustrated in FIG. 2, the high latency, high bandwidth communication link 208 may be implemented using a transmission line 244 passing through the earth 256, which may include passing under or through an ocean or other body of water. As shown in FIG. 2, the high latency, high bandwidth communication link 208 may include one or more repeaters 252. FIG. 2 illustrates four repeaters 252 along the transmission line 244 although any suitable number of repeaters 252 may be used. The transmission line 244 may also have no repeaters 252 at all. Although FIG. 2 illustrates the low latency, low bandwidth communication link 204 transmitting information from the first communication node 212 to the second communication node 216, the data transmitted may pass along the low latency, low bandwidth communication link 204 and high latency, high bandwidth communication link 208 in both directions.

As shown, the communication system 200 further includes a client 260 that has a connection 264 to the first communication node 212. The client 260 is configured to send instructions over the connection 264 to the first communication node 212. In the illustrated example, the connection 264 includes a wireless connection 266 such as a microwave network. At the first communication node 212, the instructions are prepared to be sent to the second communication node 216, either by the low latency, low bandwidth communication link 204 or the high latency, high bandwidth communication link 208, or both. As shown, the second communication node 216 is connected to an instruction processor 268 via a connection 272. It should be recognized that the connection 272 can include wireless connection 266 like a microwave or other type of wireless connection. The client 260 may be any business, group, individual, and/or entity that desires to send directions over a distance. The instruction processor 268 may be any business, group, individual, and/or entity that is meant to receive or act upon those instructions. In some embodiments, the connection 264 and connection 272 may be unnecessary as the client 260 may send the data to be transmitted directly from the first communication node 212 or the second communication node 216 may be connected directly to the instruction processor 268. The communication system 200 may be used for any kind of low-latency data transmission that is desired. As one example, the client 260 may be a doctor or surgeon working remotely while the instruction processor 268 may be a robotic instrument for working on a patient.

In some embodiments, the client 260 may be a financial instrument trader and the instruction processor 268 may be a stock exchange. The trader may wish to provide instructions to the stock exchange to buy or sell certain securities or bonds at specific times. Alternatively or additionally, the instructions are in the form of news and/or other information supplied by the trader and/or a third party organization, such as a news organization or a government. The trader may transmit the instructions to the first communication node 212 which sends the instructions and/or news to the second communication node 216 using the transmitting antenna 228, receiving antenna 232, and/or by the transmission line 244. The stock exchange can then process the actions desired by the trader upon receipt of the instructions and/or news.

The communication system 200 may be useful for high-frequency trading, where trading strategies are carried out on computers to execute trades in fractions of a second. In high-frequency trading, a delay of mere milliseconds may cost a trader millions of dollars; therefore, the speed of transmission of trading instructions is as important as the accuracy of the data transmitted. In some embodiments, the trader may transmit preset trading instructions or conditions for executing a trade to the second communication node 216, which is located within close proximity to a stock exchange, using the high latency, high bandwidth communication link 208 at a time before the trader wishes to execute a trade. These instructions or conditions may require the transmission of a large amount of data, and may be delivered more accurately using the high latency, high bandwidth communication link 208. Also, if the instructions or conditions are sent at a time prior to when a trade is wished to be executed, the higher latency of the high latency, high bandwidth communication link 208 can be tolerated.

The eventual execution of the instructions may be accomplished by the trader transmitting triggering data to the communication system 200 on which the instructions are stored. Alternatively or additionally, the triggering data can includes news and/or other information supplied by the trader and/or a separate, third party organization. Upon receipt of the triggering data, the trading instructions are sent to the stock exchange and a trade is executed. The triggering data that is transmitted is generally a much smaller amount of data than the instructions; therefore, the triggering data may be sent over the low latency, low bandwidth communication link 204. When the triggering data is received at the second communication node 216, the instructions for a specific trade are sent to the stock exchange. Sending the triggering data over the low latency, low bandwidth communication link 204 rather than the high latency, high bandwidth communication link 208 allows the desired trade to be executed as quickly as possible, giving the trader a time advantage over other parties trading the same financial instruments.

Figure 3:
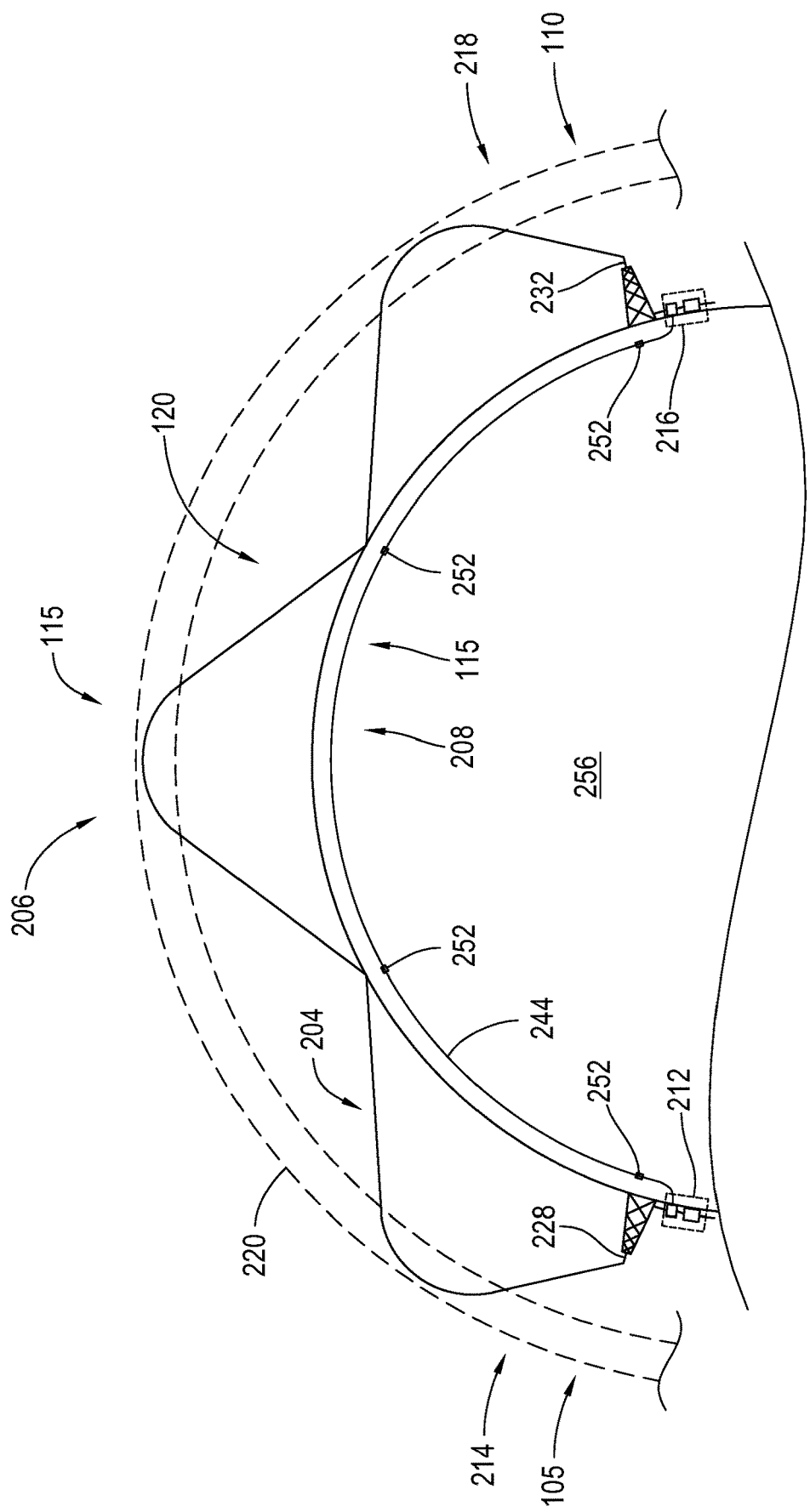
FIG. 3 is a side view of the FIG. 2 communication system in one variation.

The configuration shown in FIG. 2 is further illustrated in FIG. 3 where the first communication node 212 and the second communication node 216 are geographically remote from one another separated by a substantial portion of the surface of the earth 256. This portion of the earth's surface may include one or more continents, oceans, mountain ranges, and/or other geographic areas. For example, the distance spanned in FIG. 2 may cover a single continent, multiple continents, an ocean, and the like. In one example, the first communication node 212 is in Chicago, Ill. in the United States of America, and the second communication node 216 is in London, England, in the United Kingdom. In another example, the first communication node 212 is in New York City, N.Y., and the second communication node 216 is in Los Angeles, Calif., both cities being in North America. As shown, the transmitting antenna 228 and receiving antenna 232 are separated by a distance greater than the radio horizon such that no line of sight communications can be made. Instead, a skywave communication technique is used in which the electromagnetic waves 224 of the low latency, low bandwidth communication link 204 are skipped multiple times between the transmitting antenna 228 and receiving antenna 232. Any suitable combination of distance, communication nodes, and communications links is envisioned that can provide satisfactory latency and bandwidth.

FIG. 2 illustrates that skywave propagation allows electromagnetic energy to traverse long distances. Using skywave propagation, the low latency, low bandwidth communication link 204 transmits the electromagnetic waves 224 into a portion of the atmosphere 220 that is sufficiently ionized to refract the electromagnetic waves 224 toward the earth 256. The waves may then be reflected by the surface of the earth 256 and returned to the ionized portion of the upper atmosphere 220 where they may be refracted toward earth 256 again. Thus electromagnetic energy may "skip" repeatedly allowing the electromagnetic waves 224 to cover distances substantially greater than those which may be covered by non-skywave propagation.

Figure 4:
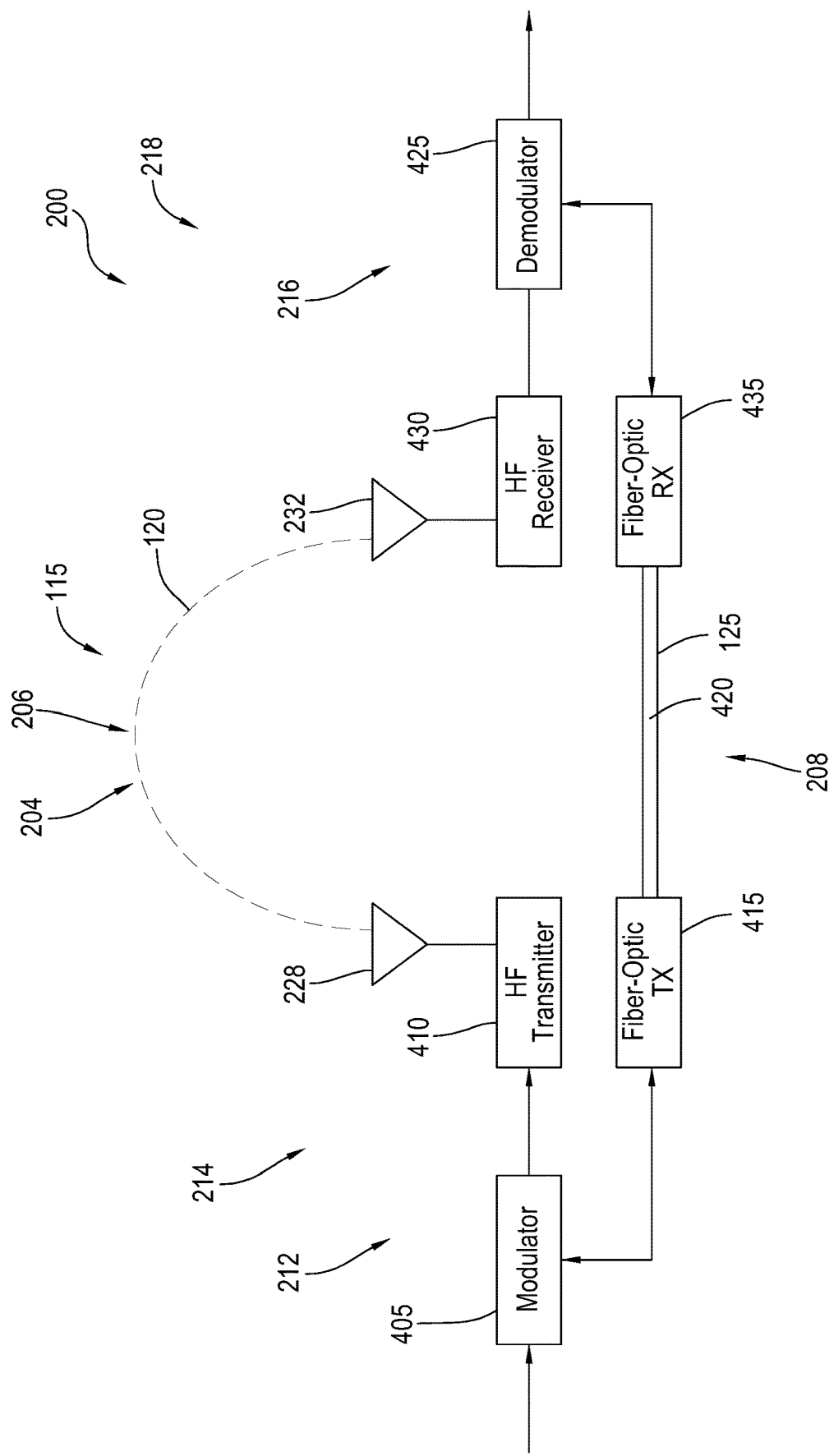
FIG. 4 is a diagrammatic view of the FIG. 2 communication system showing further details.

FIG. 4 shows a specific implementation of the FIG. 2 communication system 200. As can be seen, the first communication node 212 at the transmission station 214 in FIG. 4 includes a modulator 405, a radio transmitter 410, and a fiber optic transmitter 415. The modulator 405 includes one or more processors and memory along with other electronics, software, and/or firmware configured to modulate the message and/or other information using the above-mentioned variable messaging length technique which will be further described below. The radio transmitter 410 is operatively connected to the modulator 405 so as to transmit the message and/or other data to the receiving station 218 via the transmitting antenna 228 over the HF radio channel 206. In the depicted example, the radio transmitter 410 transmits the message and/or other data via the primary communication channel 120. The fiber optic transmitter 415 is operatively connected to the modulator 405 and a fiber optic cable 420 that forms at least part of the backend communication channel 125. The fiber optic transmitter 415 is configured to transmit to the second communication node 216 one or more message tables and/or other information, such as a duplicate copy of the message transmitted by the radio transmitter 410, via the backend communication channel 125.

The second communication node 216 in FIG. 4 includes a demodulator 425, a radio receiver 430, and a fiber optic receiver 435. The demodulator 425 includes one or more processors and memory along with other electronics, software, and/or firmware configured to demodulate the message and/or other information from the first communication node 212 using the above-mentioned technique which will be further described below. The radio receiver 430 is operatively connected to the demodulator 425 so as to receive the message and/or other data from the first communication node 212 via the receiving antenna 232. In the illustrated example, the radio receiver 430 again receives the message and/or other data via the primary communication channel 120. The fiber optic receiver 435 is operatively connected to the demodulator 425 and the fiber optic cable 420. The fiber optic receiver 435 is configured to receive from the fiber optic transmitter 415 of the first communication node 212 the message tables and/or other information, such as a duplicate copy of the message from the modulator 405.

It should be recognized that the communication system 200 in FIG. 4 can facilitate one-way communication or two-way communication. For example, the modulator 405 can be configured to act as a modulator-demodulator (modem), and the demodulator 425 can likewise be a modem. The HF radio transmitter 410 in certain variations can be configured to receive wireless communications so as to act as a wireless transceiver. Similarly, the HF radio receiver 430 can also be a wireless transceiver. Both the fiber optic transmitter 415 and fiber optic receiver 435 can be fiber optic transceivers to facilitate two-way communication.

Figure 5:
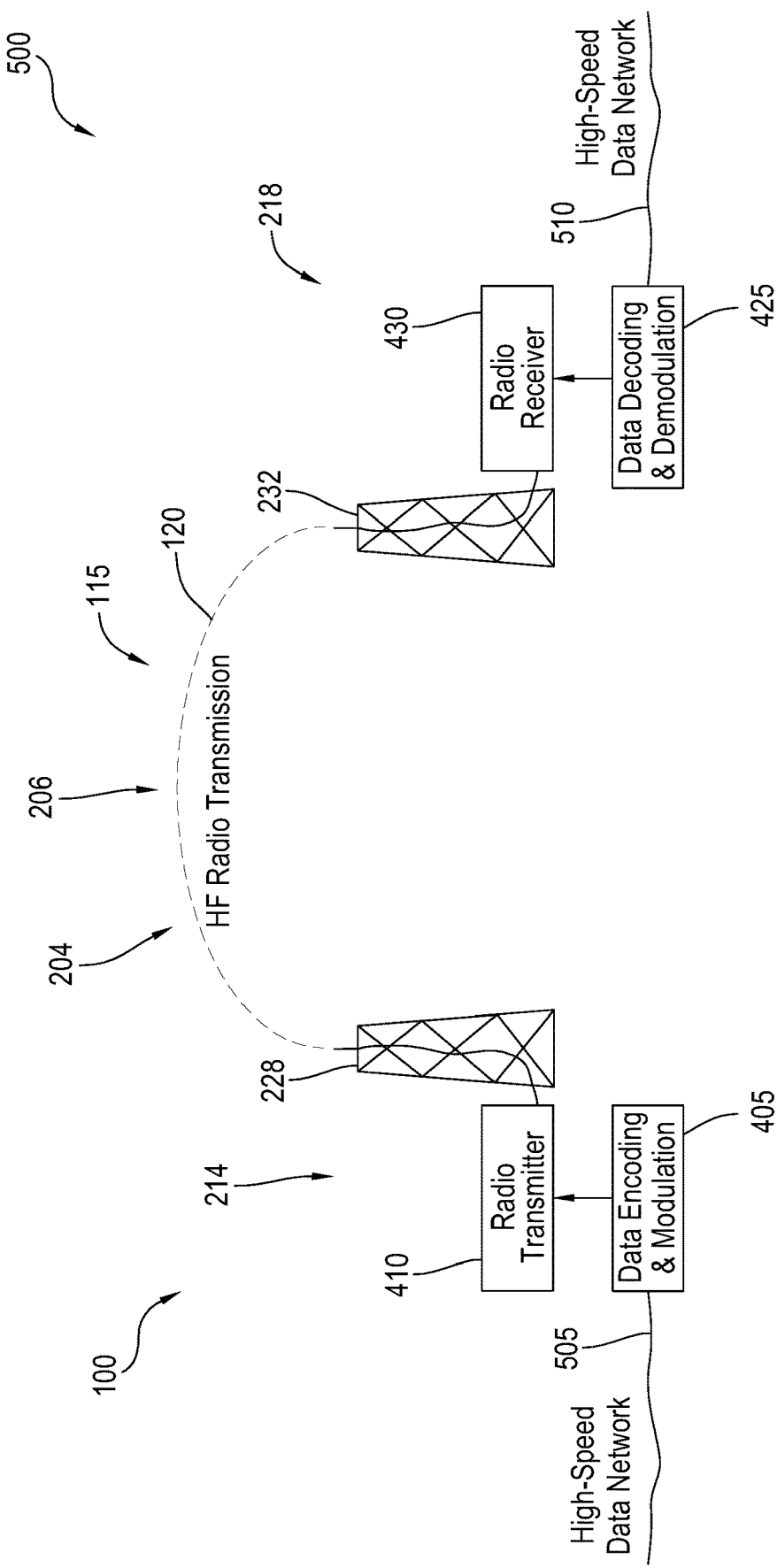
FIG. 5 is a diagrammatic view of a communication system according to a further example.

FIG. 5 shows another variation of the communication system 100 in FIG. 1 that can perform the low latency framing technique described herein. As can be seen, a communication system 500 in FIG. 5 is constructed in a similar fashion and shares a number of components in common with the communication system 200 of FIGS. 2, 3, and 4. For instance, the communication system 500 includes the modulator 405 and the radio transmitter 410 with the transmitting antenna 228 at the transmission station 214 of the type described before. Moreover, the communication system 500 includes the demodulator 425 and the radio receiver 430 with the receiving antenna 232 at the receiving station 218 of the kind mentioned above. As can be seen, however, the fiber optic transmitter 415, fiber optic cable 420, and fiber optic receiver 435 have been eliminated such that all communications are wireless, and more particularly, through skywave communication via the HF radio channel 206. In one variation, the communication system 500 includes a single communication channel 115 in the form of the low latency, low bandwidth communication link 204 that forms the primary communication channel 120. In another variation, the radio communication between the radio transmitter 410 and radio receiver 430 is through two or more HF communication channels 115 such that one forms the primary communication channel 120 and the other forms the backend communication channel 125. In one version, the primary communication channel 120 and the backend communication channel 125 can have generally the same data bandwidth and/or latency, and in other versions, the primary communication channel 120 and backend communication channel 125 can have different data bandwidths and/or latencies. The modulator 405 in the illustrated example is connected to the client 260 through a high speed transmitter data network 505. The demodulator 425 is connected to the instruction processor 268 through a high speed receiver data network 510. In one form, the high speed transmitter data network 505 and high speed receiver data network 510 are high speed data networks.

Figure 6:
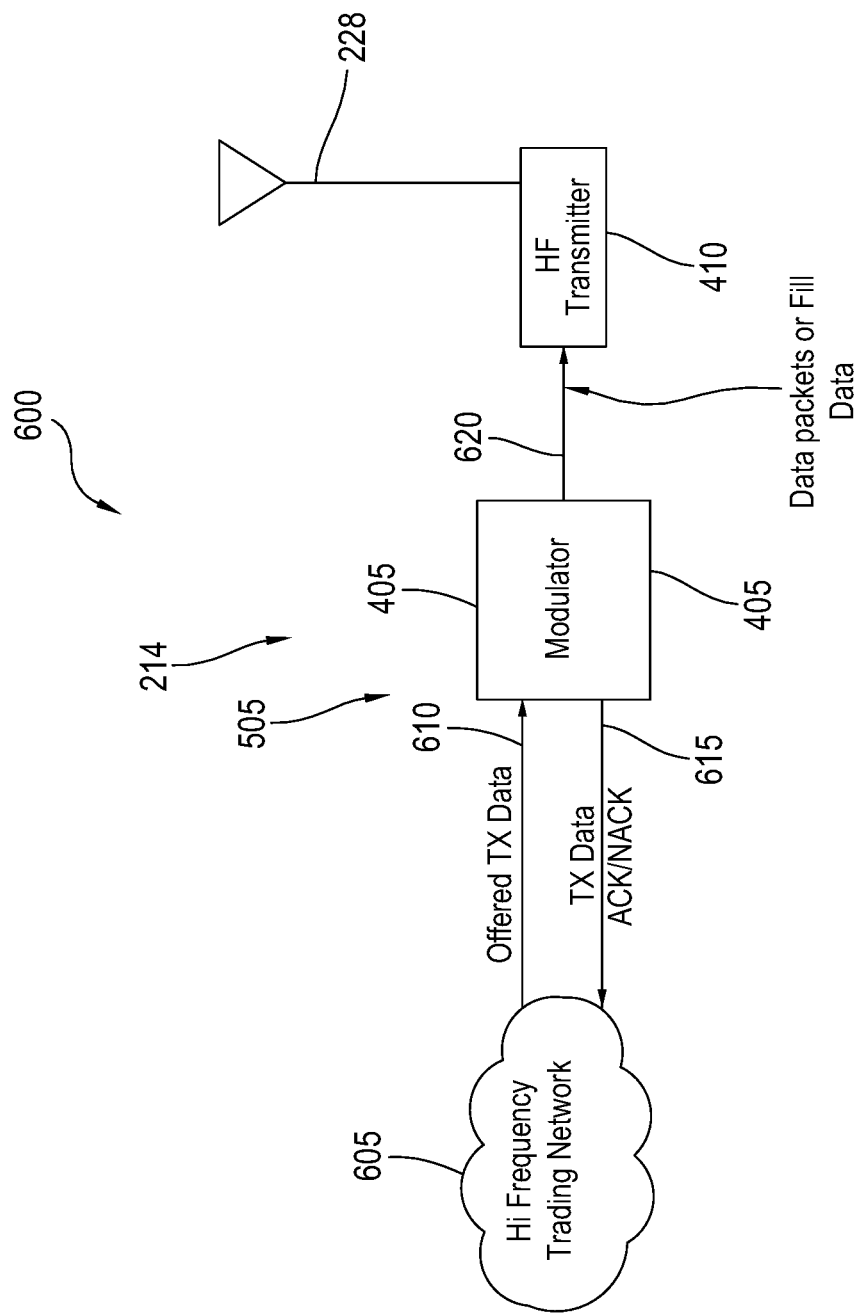
FIG. 6 is a diagrammatic view of a transmission station.

FIG. 6 shows one example of a transmitter system 600 that can be implemented in the FIG. 2 communication system 200 and the FIG. 5 communication system 500 as well as other communication systems 100. The transmitter system 600 includes the modulator 405 and radio transmitter 410 with the transmitting antenna 228 at the transmission station 214. As illustrated, the transmitter system 600 communicates with a high frequency trading network 605 over the high speed transmitter data network 505. Over the high speed transmitter data network 505, the high frequency trading network 605 communicates user data 610, such as a financial transaction command (e.g., buy, sell, hold, etc.), to the modulator 405 of the transmitter system 600. The high frequency trading network 605 sends the user data 610 to the transmitter system 600 with the intent for the user data 610 to be transmitted to a receiving station. While most of these messages are transmitted, some of these messages may not be ultimately transmitted to the radio receiver 430. The modulator 405 is configured to send transmission acknowledgement data 615 over the high speed transmitter data network 505 back to the high frequency trading network 605 so as to acknowledge whether or not the message was transmitted. Additional information, such as why the message was not sent, can be further included in the transmission acknowledgement data 615 back to the user or message requestor. When user data 610 is able to be transmitted, the modulator 405 modulates the user data 610 into transmitted data 620 which is sent to the radio transmitter 410 for transmission.

High-frequency trading as well as other time sensitive activities needs minimal delay from end-to-end. Consequently, communications in these environments should have as little overhead in the transmitted message, and the message transmission process should have the smallest latency or delay as possible. Packets, which may contain trading instructions, should begin transmission with minimum delay. In light of this, a unique communication method or technique has been developed to facilitate minimal, or no, transmit queuing delay, and this method has the capability to support asynchronous packet arrivals and transmissions over the air. Among other things, this technique is able to handle variable inter-packet timing issues, and at the same time, this technique provides low communication delays.

As should be appreciated, the transmission time using the low latency, low bandwidth communication link 204, such as the HF radio channel 206 using skywave propagation, for a given message is typically longer than the transmission time using the high speed transmitter data network 505. In other words, the low latency, low bandwidth communication link 204 has a transmission time that is greater than the high speed transmitter data network 505 used by the high frequency trading network 605. As a result, the low latency, low bandwidth communication link 204 creates a bottleneck along the communication path for the message. This method and system is configured to reduce the system-wide transmission time. In the communication system 200 of FIG. 2 for example, the system-wide transmission time would be generally the time a packet takes to traverse the communication system 200 from the client 260 to the instruction processor 268. For the communication system 500 in FIG. 5, the system-wide transmission time would be generally the time a packet takes to traverse the communication system 500 from the high speed transmitter data network 505 to the high speed receiver data network 510.

Figure 7:
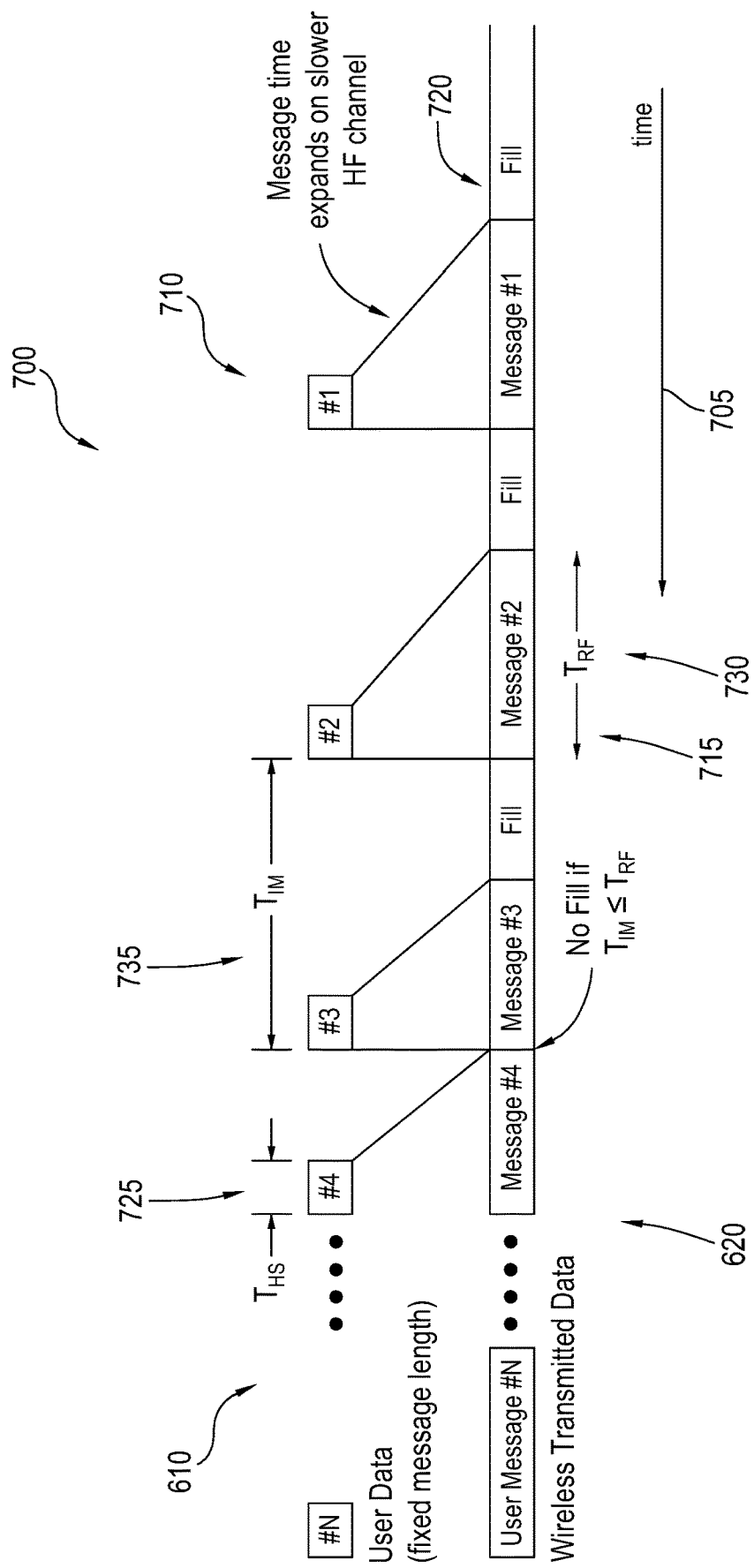
FIG. 7 is a diagram illustrating a technique for user data packet encoding and user message transmission.

FIG. 7 includes a diagram 700 that shows the relative size and timing of the user data 610 and transmitted data 620. In the diagram 700 of FIG. 7, time 705 flows from right to left. The user data 610 includes one or more user data packets 710. The transmitted data 620 includes one or more user messages 715 that are created based on the user data packets 710. The transmitted data 620 further includes fill data 720 that is normally (but not always) located between the individual user messages 715 so as to fill the space in between the user messages 715. Among other things, the fill data 720 helps radio receiver 430 to maintain a lock on the HF radio channel 206. The user data packets 710 are transmitted with a high speed network packet transmission time ($T_{HS}$) 725 over the high speed transmitter data network 505. Considering the HF radio channel 206 is slower than the high speed transmitter data network 505, the message time for the user data packets 710 expands on the HF radio channel 206. The modulator 405 encodes and modulates the relatively short user data packets 710 to the relatively longer user messages 715 for the HF radio channel 206. As shown, the user messages 715 each have a radio frequency channel message transmission time ($T_{RF}$) 730 that is longer than high speed network packet transmission time 725. In other words, the packet transmission time over HF radio channel 206 is longer than the high speed network packet transmission time 725 on the high speed transmitter data network 505.

Each of the user messages 715 has an inter-packet period or inter-message transmission time ($T_{IM}$) 735 that defines the time between the user data packets 710. In some cases, the inter-message transmission time 735 is a fixed period, and the inter-message transmission time 735 in other cases can vary from user data packet 710 to user data packet 710. In other words, the packets may be contiguous or have a variable inter-packet period. As noted before, the communication system 100 includes the primary communication channel 120 and the backend communication channel 125. In one example, the primary communication channel 120 normally has low latency, but the primary communication channel 120 further has lower bandwidth. The backend communication channel 125 can have higher bandwidth than the primary communication channel 120, but the backend communication channel 125 also has higher latency than the primary communication channel 120. In the FIG. 4 example, the primary communication channel 120 is the low latency, low bandwidth communication link 204 in the form of the HF radio channel 206, and the backend communication channel 125 is the high latency, high bandwidth communication link 208 in the form of the fiber optic cable 420. In the FIG. 5 example, the primary communication channel 120 is a first HF radio channel 206 that forms the low latency, low bandwidth communication link 204, and the backend communication channel 125 is a second HF radio channel 206 that forms the high latency, high bandwidth communication link 208. Considering the primary communication channel 120 has a lower latency than the backend communication channel 125 in this example, relatively small or short user messages 715 that are transmitted at the same time from the transmission station 214 along the primary communication channel 120 and backend communication channel 125 will be first received at the receiving station 218 via the primary communication channel 120. However, since the backend communication channel 125 has a larger bandwidth, larger user messages 715 will be received at the receiving station 218 more quickly through the backend communication channel 125 than through the primary communication channel 120. The inter-message transmission time 735 represents a cut-off time or value of where the primary communication channel 120 or backend communication channel 125 will be faster. Again, the cut-off time represented by the inter-message transmission time 735 can vary due to a number of factors, such as the conditions of the primary communication channel 120 and backend communication channel 125.

With this communication method, when the calculated radio frequency channel message transmission time 730 for an individual user message 715 is less than or equal to the inter-message transmission time 735, the user message 715 is transmitted via the primary communication channel 120 (e.g., the HF radio channel 206 in FIGS. 4 and 5), and when the calculated radio frequency channel message transmission time 730 is greater than the inter-message transmission time 735, the user message 715 is transmitted to the receiving station 218 via the backend communication channel 125. In other words, packets at the input of the radio transmitter 410 (and/or modulator 405) in one variation are rejected if the packets will be delayed by any transmit queue beyond what is useful for a financial trading application or strategy. The packets, which will take longer to reach the receiving station 218 than alternative communication channels 115, for example a high-speed fiber optic network, are rejected for transmission over the HF radio channel 206, and instead, the packets are sent via one or more of the faster communication channels 115. For instance, with the communication system 200 in FIG. 4, if the user message 715 will be transmitted faster via the HF radio channel 206, then the radio transmitter 410 transmits the user message 715 over the HF radio channel 206 to the receiving station 218. On the other hand, when the radio frequency channel message transmission time 730 for the user message 715 is greater than the inter-message transmission time 735, the user message 715 is transmitted via the fiber optic cable 420 to the receiving station 218. In case of a tie, one of these communication channel 115 is picked as the default, or the user message 715 is transmitted on both the HF radio channel 206 and the fiber optic cable 420. Sometimes duplicate copies of the user message 715 are also transmitted on both the HF radio channel 206 and the fiber optic cable 420 for modem management and/or other purposes. For the FIG. 5 example, multiple HF radio channels 206 with differing latencies and bandwidths are used to communicate the radio frequency channel message transmission time 730 to the receiving station 218. A similar method is used to select the appropriate HF radio channel 206.

Figure 8:
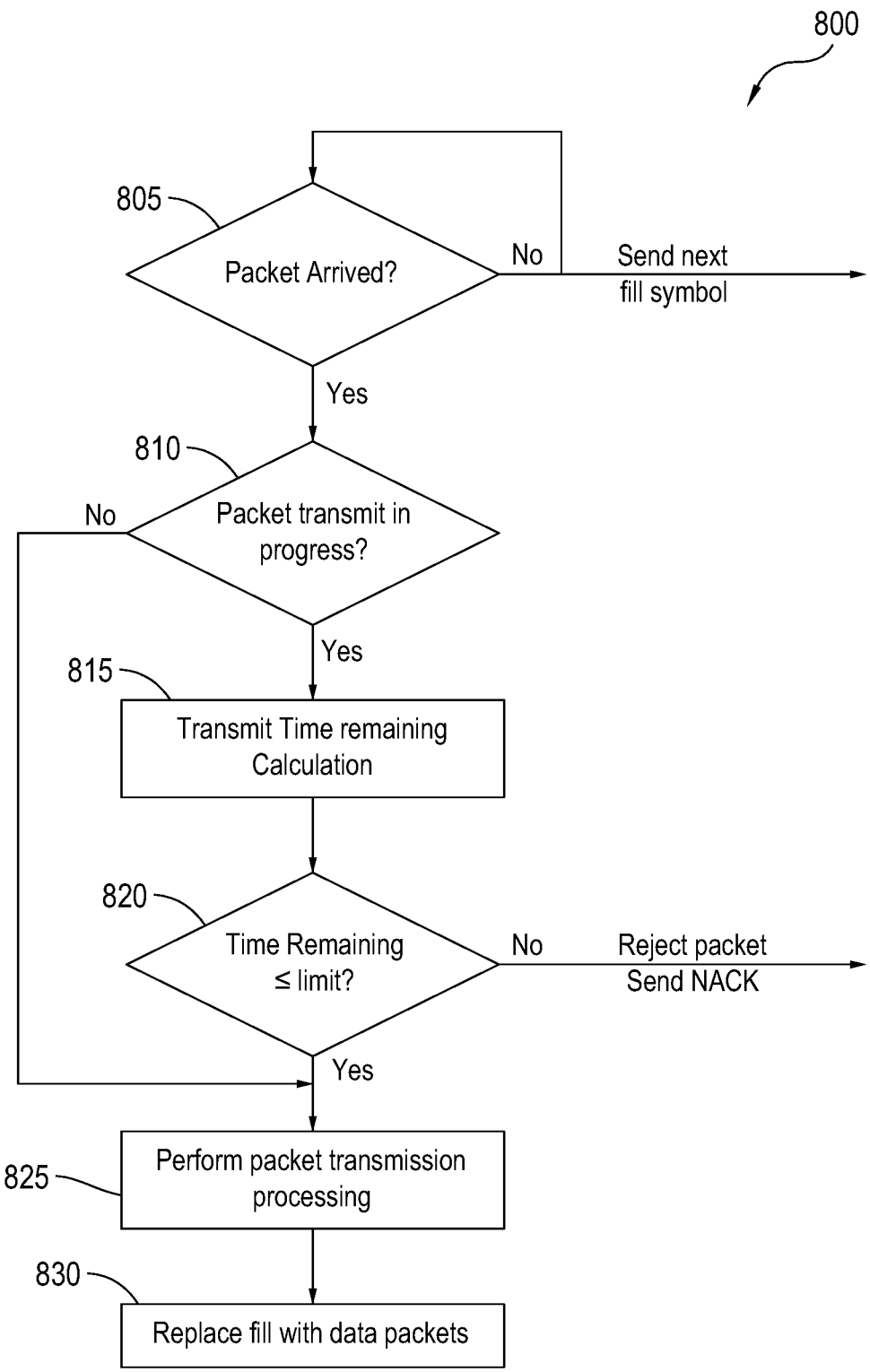
FIG. 8 is a flowchart illustrating a technique for accepting and rejecting user data packet for transmission.

FIG. 8 includes a flowchart 800 illustrating this unique method or technique. This method will be described as the modulator 405 performing the acts, but it should be recognized that other equipment such as separate computers can partially or fully perform these acts. In one form, the modulator 405 is hardwired with electronics to perform this method, and in other examples, the modulator 405 includes a combination of hardware, such as a processor and memory, and software to perform the acts. In one form, the modulator 405 is incorporated into a modem that is configured for two-way communication.

Looking at FIGS. 6, 7, and 8, the modulator 405 in stage 805 determines if a new user data packet 710 has arrived from the high frequency trading network 605 via the high speed transmitter data network 505. If a new user data packet 710 has not arrived, the modulator 405 sends a fill symbol that forms the fill data 720 of the transmitted data 620 that is transmitted by the radio transmitter 410. Once the fill symbol is sent, the modulator 405 then again checks if a new user data packet 710 has arrived. The fill data 720 is configured to produce an idle sequence for the radio receiver 430 and the receiving station 218 to maintain lock onto the transmitted waveform. In one example, the fill data 720 may be interrupted at any time without consequence to system performance.

When a new user data packet 710 arrives from the high frequency trading network 605, the modulator 405 determines whether the radio transmitter 410 is transmitting transmitted data 620 with one or more user messages 715 in stage 810. If the transmitted data 620 for the radio transmitter 410 includes a user message 715 in stage 810, the modulator 405 in stage 815 calculates, retrieves from memory, and/or otherwise determines the radio frequency channel message transmission time 730 and the inter-message transmission time 735. When the modulator 405 determines the inter-message transmission time 735 is more than the inter-message transmission time 735 in stage 820, the modulator 405 sends a transmission acknowledgement data 615 back to the high frequency trading network 605 indicating the new user data packet 710 has been rejected. When this occurs, the modulator 405 determines that the user message 715 in the transmitted data 620 will collide or overlap with one another. Under this condition, the new user message 715 will not be able to be incorporated into the transmitted data 620 for transmission over the HF radio channel 206 or other primary communication channel 120. Upon receipt of the transmission acknowledgement data 615 with this alert, the client can then take corrective action such as transmitting the user data packets 710 over another communications channel, such as the backend communication channel 125. Alternatively or additionally, the modulator 405 can transmit the user data packet 710 over a different backend communication channel 125. For instance, the modulator 405 can send a packet with the user data packets 710 over the fiber optic cable 420 (FIG. 4) and/or over a different HF radio channel 206 (FIG. 5). After rejecting the packet, the modulator 405 can proceed in continue processing the current in stage 825 or to stage 805.

When the new user data packet 710 passes the time limit in stage 820, the modulator 405 will process the user data packet 710 to incorporate the requisite overhead for transmitting the transmitted data 620 via the radio transmitter 410. For example, the user message 715 in one example is encoded using a forward error correction (FEC) that further includes a checksum. Once the modulator 405 finishes processing the packet information for the user message 715 in stage 825, the modulator 405 replaces the packets for the fill data 720 in the transmitted data 620 with the packets for the processed user messages 715. Subsequently, the radio transmitter 410 transmits the transmitted data 620 from the modulator 405 over the HF radio channel 206 to the receiving station 218. After stage 830, the modulator 405 cycles back to stage 805 so as to further monitor packet arrival of user data 610 from the high frequency trading network 605.

Figure 9:
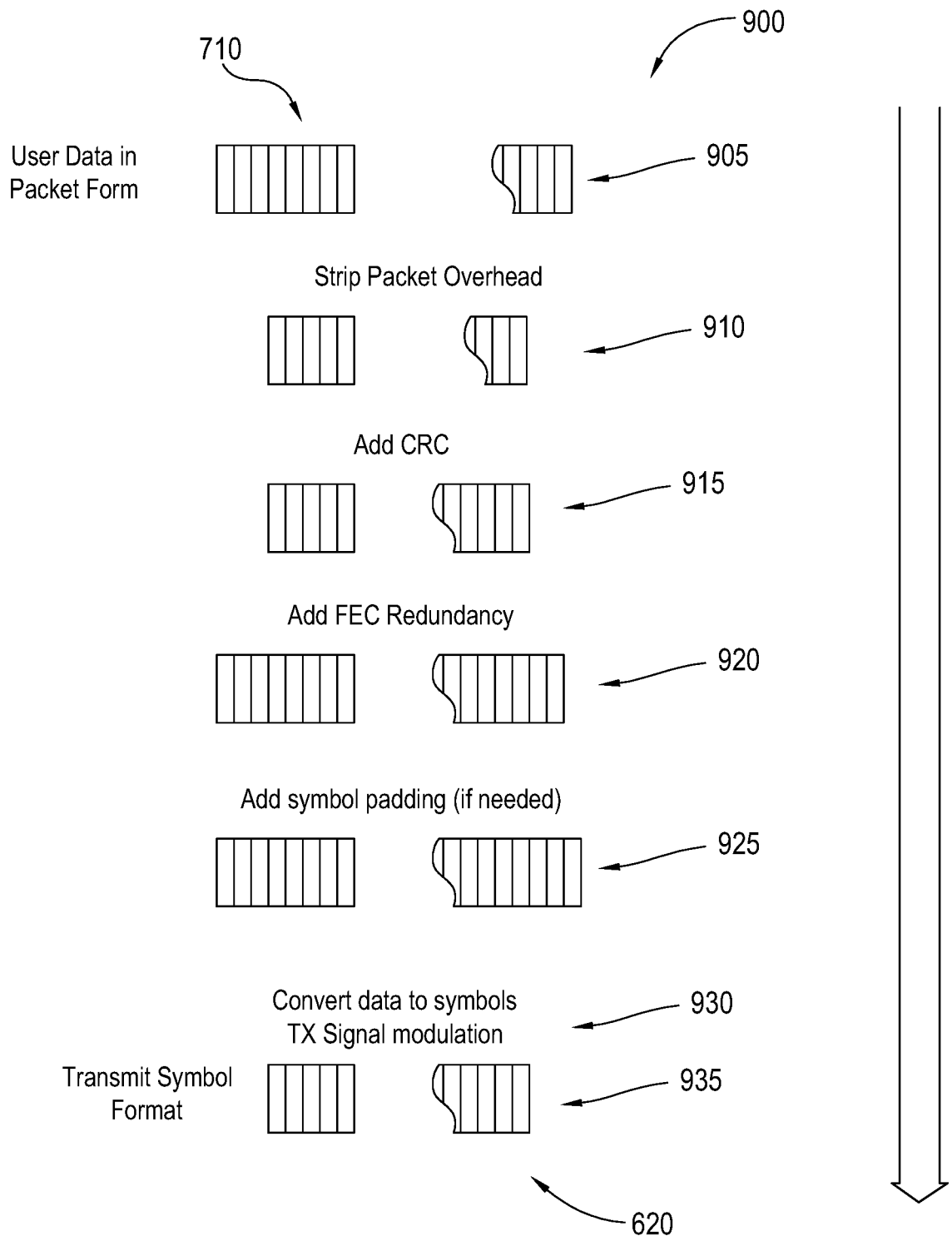
FIG. 9 is a diagram of a technique for encoding the user data packet.

FIG. 9 includes a diagram 900 that depicts an example method for performing packet transmission processing and fill data replacement in stage 825 and stage 830 of FIG. 8. Through the technique shown in the diagram 900 of FIG. 9, the modulator 405 converts the user data packet 710 to the transmitted data 620. In stage 905, the modulator 405 receives, retrieves, or is otherwise provided the user packet 710. When the user data 610 arrives, the user data packet 710 is collected. The user data path is generally a high-bandwidth channel (e.g., high speed transmitter data network 505) and data collection time is short as compared to the radio transmission time over the HF radio channel 206.

The modulator 405 in stage 910 strips overhead data from the user data packet 710. Unneeded packet overhead is removed in stage 910. For example, internet protocol (IP) header data can often be removed and/or reduced through compression techniques such as robust header compression (ROHC) developed by the Internet Engineering Task Force (IETF). In stage 915, the modulator 405 adds a checksum to the data. In one example, the checksum is a cyclic redundancy check (CRC). Other robust checksum approaches may be used in further examples.

To promote error detection and correction at the receiving station 218, the modulator 405 in stage 920 adds FEC redundancy to enable FEC at the receiving station 218. In one example, a tail-biting convolutional code is used, and in another example, a Reed Solomon and/or other block coding scheme is used in stage 920. If needed, the modulator 405 adds symbol padding to the packet data in stage 925. This padding is used to align the data with the OTA modulation symbol that encodes two or more bits per symbol. In stage 930, the modulator 405 converts the data into symbols that are suitable for transmission such as via the HF radio channel 206. The resulting transmit data that forms the transmitted data 620 is generated by the modulator 405 in stage 935. In another variation, the packets for the fill data 720 for stage 830 in FIG. 8 are added to the data during or after stage 935. In other words, if no user data 610 is present, then fill data 720 is transmitted in place of the user data 610.

Once more, fill data 720 is generally transmitted when no user data is available for transmission. The fill data 720 produces an idle sequence for the radio receiver 430 to maintain lock onto the transmitted waveform. The fill data 720 may be interrupted at any time without consequence to system performance. One example of a suitable fill data type is pseudo-noise data patterns generated with a shift register method. However, the fill data 720 rarely may incorrectly identified at the receiving station 218 as being a legitimate user message 715. As should be appreciated, this type of false positive can be especially detrimental in financial transactions by causing unexpected and significant financial losses. To avoid this false packet detection, the fill data 720 in one example is pre-processed at the transmission station 214 with receive FEC and receive CRC processes.

This FEC and CRC preprocessing is used by the receiving station 218 to detect any unintended false positives. Referring again to FIG. 7, the packets for the radio frequency channel message transmission time 730 may be contiguous or have a variable inter-message transmission time 735. Between the packets for the radio frequency channel message transmission time 730, the modulator 405 sends the fill data 720. It is sometimes desirable the fill data 720 has no direct current ("DC") bias, minimal (or no) spectral components, and/or occupies the assigned spectrum so as to optimize channel equalization.

Figure 10:
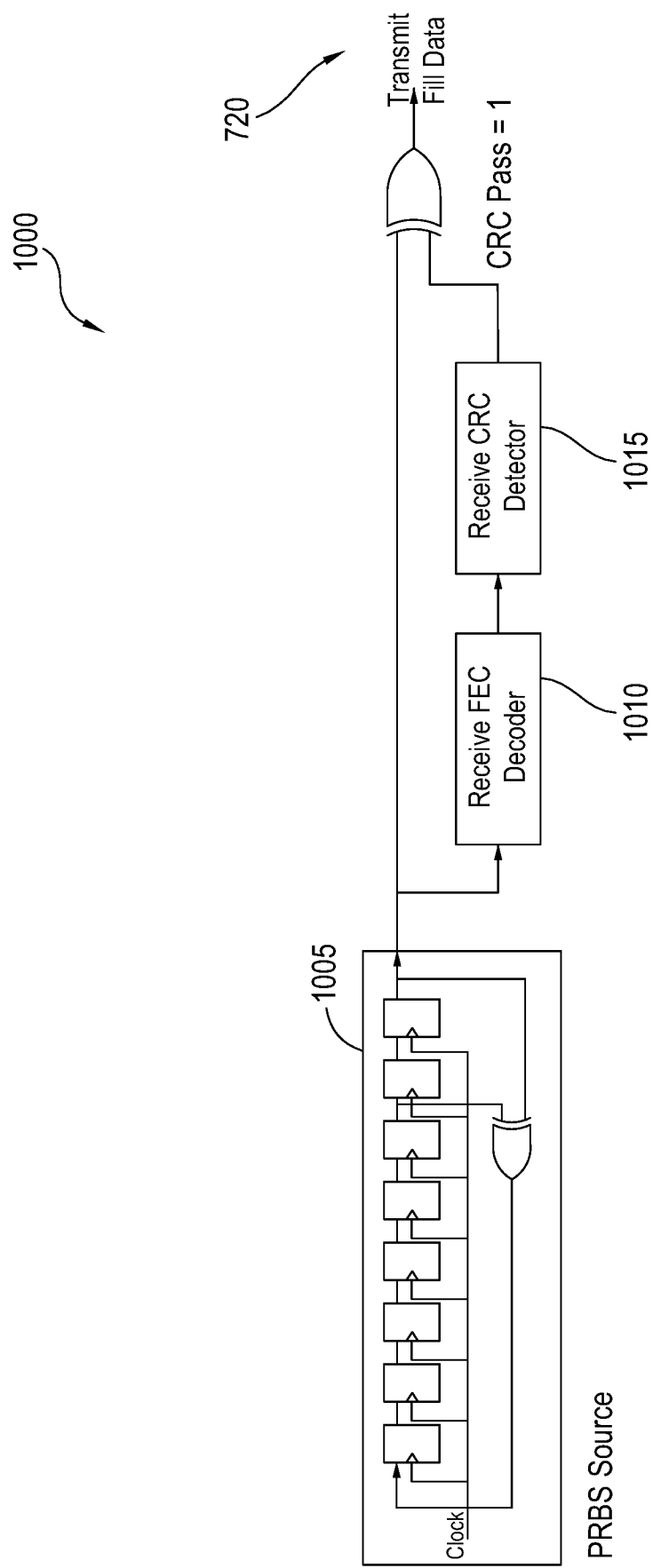
FIG. 10 is a diagrammatic view of a fill data generation system.

In one example, the fill data 720 includes a pseudorandom binary sequence ("PRBS") of data. Looking at FIG. 10, a fill data generation system 1000 includes a PRBS source 1005, a receive FEC decoder 1010, and a receive CRC detector 1015. It should be recognized that the fill data generation system 1000 can implemented through hardware, software, or both. The PRBS source 1005 is configured to generate the PRBS. The PRBS source 1005 simulates the process of FEC decoding at the demodulator 425 at the receiving station 218 based on the PRBS data. Based on the FEC data from the receive FEC decoder 1010, the PRBS source 1005 simulates the process of CRC detection at the demodulator 425. One or more bits or symbols of the resulting data from the receive CRC detector 1015 can be changed or otherwise used to modify the PRBS data such that the resulting fill data 720 will fail the FEC and CRC checks at the receiving station 218 with minimal impact to the transmitted data 620.

Figure 11:
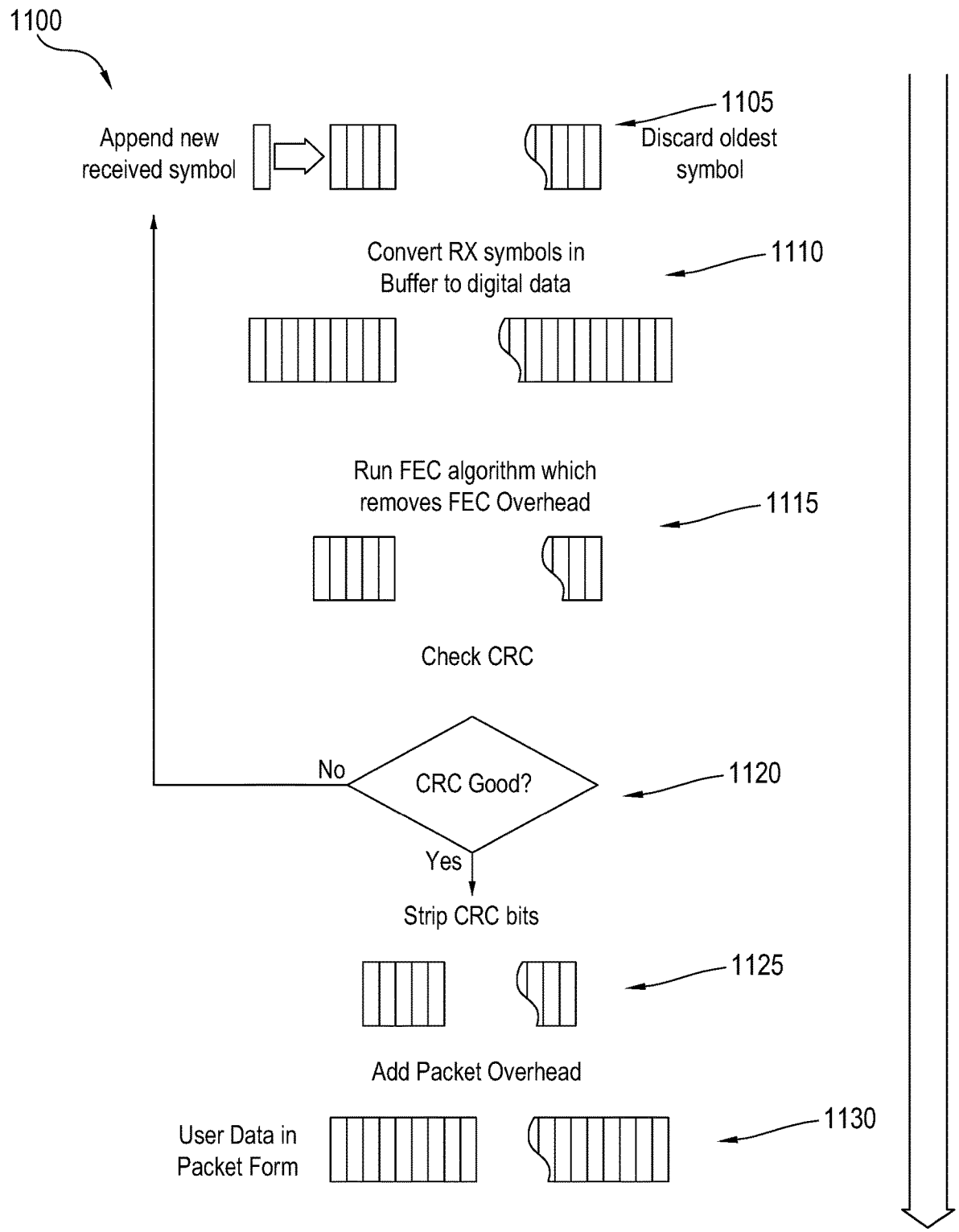
FIG. 11 is a diagram of a technique fro decoding transmitted data.

FIG. 11 shows a diagram 1100 that depicts a process the demodulator 425 performs to decode and detect valid messages. In stage 1105, the radio receiver 430 converts the received RF energy from the HF radio channel 206 into a digital baseband data stream. This data stream may include hard and/or soft-decision symbol estimates. The usual receiver functions of symbol timing recovery, frequency correction, gain control, and the like operate on both fill the user message 715 and fill data 720 as received. The one or more newly received symbols are appended to the older symbols stored in the memory of the radio receiver 430. The decoder length, N, is of suitable length for the number of symbols in an encoded user data packet 710. The decoder length varies by message length, modulation selected (QPSK, 16 QAM, etc.), and the FEC overhead selected. Each is selected according to the HF channel behavior and the desired level of error protection.

The radio receiver 430 in stage 1110 converts these received symbols in the memory buffer to digital data so as to facilitate later decoding. The radio receiver 430 at the receiving station 218 in stage 1115 runs an FEC algorithm to decode the message and remove any FEC overhead such as extraneous parity check bits. In this case, the FEC is done based on the specified message length for the demodulator 425. In one example, this FEC algorithm is a Tail-Biting Viterbi Algorithm, but in other examples, the FEC algorithm can be a different tail-biting convolutional decoding algorithm and/or an FEC block code algorithm such as Reed Solomon.

The demodulator 425 in stage 1120 performs a CRC check based on the FEC decoded data to see if the message is valid. In one form, a combination Tail-Biting Viterbi FEC and a CRC checksum is used. Other FEC codes and checksums may be used. If the CRC is not valid in stage 1120, the demodulator 425 proceeds to wait for the next symbol in stage 1105, and the cycle continues again. On the other hand, when a valid message is detected in stage 1120, the radio receiver 430 strips any CRC bits from the message in stage 1125. If the hardware and/or software of the radio receiver 430 used to implement stage 1115 and stage 1120 takes longer than one symbol period to perform, then a set of multiple (M) radio receivers 430 are used with each offset by one symbol period so that the time to receive the encoded user message, Nx Tsymbol, divided by the M is ≤the maximum acceptable decoder processing time.

Following stage 1125, the now stripped message is repackaged with packet overhead and user data is added to the packet in stage 1130. The demodulator 425 sends a data detect signal and the decoded message to the instruction processor 268. This new message can then be used to execute an action such as a financial transaction.

This encoding and decoding technique does not add overhead for framing words. It should be appreciated that framing words reduce the utility of the radio channel by consuming radio spectrum. Moreover, this method adds minimal jitter and latency as compared to systems using fixed framing structures or special symbol sets that typically need to be pre-pended to, appended to, or inserted into a data message. With this method, changing modulation techniques, packet lengths, and/or error correction techniques does not require adjustments in a frame structure. Instead the receiver determines message boundaries solely or mostly by using FEC and CRC. Additionally, changing modulation techniques, packet lengths, and/or error correction techniques does not require significant message padding in order to achieve framing alignment. The padding is limited to only that required to build any integer number of symbols. For practical modulation schemes, the number of padding bits is relatively small. The packets can be transmitted on any symbol boundary, rather than waiting for byte, word, or frame alignment as the fill data can be interrupted without penalty.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization. In the case of radio waves, an antenna may transmit at frequencies ranging along an electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data. Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical, horizontal, or any combination thereof. Antennas may also be configured to radiate electromagnetic energy within a specific range of vertical angles (i.e. "takeoff) angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies. Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Backend Communication Channel", "Secondary Communication Channel", or "Secondary Channel" generally refers to a communication pathway that is a main choice for transferring information. Typically, but not always, the secondary channel has one or more properties, such as latency or bandwidth, that make the channel less desirable over a primary channel. For example, a secondary channel can have a lower data rate and/or latency as compared to a primary channel. A primary channel may support the transfer of information in one direction only, either direction alternately, or both directions simultaneously. The secondary channel can for example include wired and wireless forms of communication. "Band" or "Frequency Bandwidth" generally refer to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 Mhz to 3 GHz as the "UHF band".

"Checksum" generally refers to data derived from a block of digital data for the purpose of detecting errors that may have been introduced during its transmission and/or storage. Typically, the checksum data is relatively small-sized. By themselves, checksums are often used to verify data integrity, but checksums are not typically relied upon to verify data authenticity. The procedure or process that generates the checksum from a data input is called a checksum function or checksum algorithm. Depending on the use case, a good checksum algorithm will usually output a significantly different value, even for small changes made to the data input. When the computed checksum for a data input matches the stored value of a previously computed checksum, the probability that the data has not been accidentally altered and/or corrupted is high. Some checksum algorithm techniques include parity byte, sum complement, and position-dependent algorithms. Check digits and parity bits are special cases of checksums that are usually appropriate for small blocks of data. Some error-correcting codes are based on special checksums which not only detect common errors, but the error correcting code in some cases further helps in the recovery of the original data.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Communication Node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus a computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above. A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible. Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Critical angle" generally refers to the highest angle with respect to a vertical line extending to the center of the Earth at which an electromagnetic wave at a specific frequency can be returned to the earth using skywave propagation.

"Critical Frequency" generally refers to the highest frequency that will be returned to the Earth when transmitted vertically under given ionospheric conditions using skywave propagation.

"Cyclic Redundancy Check" or "CRC" generally refers to an error-detecting code or technique to detect errors in digital data. For example, CRC is commonly used in digital networks and/or storage devices to detect accidental changes to raw data. CRC is based on binary division, and CRC is also sometimes referred to as polynomial code checksum. With CRC, blocks of data get encoded with or attached a short check value that is based on the remainder of a polynomial division of the contents of the blocks of data. During retrieval or decoding, the calculation is repeated. When the check values do not match, corrective action can be taken against data corruption. CRCs can be further used to facilitate error correction. The check or data verification value is a redundancy because it expands the message without adding information. CRCs can be simple to implement in binary hardware, easy to analyze mathematically, and are good at detecting common errors caused by noisy transmission channels. Given the check value has a fixed length, the function that generates the check value is sometimes used as a hash function.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz. Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Demodulation" generally refers to a process of extracting an original information-bearing signal from a carrier wave.

"Demodulator" or "Detector" generally refers to a device, such as an electronic circuit and/or computer, that extracts original information from a received modulated waveform based on one or more properties of the waveform. For example, these properties of the waveform can include amplitude, frequency, phase, and harmonics as well as other properties. After reception of the modulated carrier, the demodulator recovers the original modulating signal by the process of demodulation or detection. One or more modulators can be integrated with one or more demodulators to form a modulator-demodulator (modem). As such, the term demodulator may further refer to one or more parts, components, and/or software that demodulate within a modem.

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source. Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels. The photon is the quantum of the electromagnetic interaction and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Error Correction Code", "Error Correcting Code", or "ECC" generally refers to data and/or algorithms for expressing a sequence of numbers or other data such that any errors which are introduced can be detected and corrected within certain limitations based on the remaining numbers or data. ECC is typically used for controlling errors in data over unreliable and/or noisy communication channels. For instance, the sender encodes the message with a redundant in the form of an ECC. There are two main categories of ECCs, block codes and convolution codes. Some non-limiting examples of ECC codes include AN, BCH, Berger, constant-weight, convolutional, cyclic redundancy check (CRC), expander, group, Golay, Goppa, Hadamard, Hagelbarger, Hamming code, Latin square based, lexicographic, long, low-density parity-check (i.e., Gallager code), LT, polar, raptor, Reed-Solomon error correction, Reed-Muller, repeat-accumulate, repetition (e.g., triple modular redundancy), spinal, rateless, nonlinear, tornado, near-optimal erasure correcting, turbo code, and Walsh-Hadamard codes.

"Fiber-optic Communication" generally refers to a method of transmitting data from one place to another by sending pulses of electromagnetic energy through an optical fiber. The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial Instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Forward Error Correction" or FEC generally refers to a technique used for controlling errors in data transmission over unreliable or noisy communication channels. Typically, but not always, a sender encodes the message in a redundant way by using an error-correction code (ECC). This redundancy allows a receiver to detect a limited number of errors that may occur anywhere in the message, and the redundancy often allows these errors to be corrected without retransmission. FEC gives the receiver the ability to correct errors without needing a reverse channel to request retransmission of data. However, higher forward channel bandwidth is typically required. FEC can be used in situations where retransmissions are costly or impossible, such as one-way communication links and when transmitting to multiple receivers in multicast. FEC is commonly used in modems. FEC information can also be added to mass storage devices to enable recovery of corrupted data. There are generally two types of FEC code categories, block codes and convolution codes. FEC block codes work on fixed-size blocks (or packets) of bits or symbols of predetermined size. Some non-limiting examples of block codes include Reed-Solomon, Golay, BCH, multidimensional parity, and Hamming codes. Typical block codes are usually decoded using hard-decision algorithms in which for every input and output signal a hard decision is made whether it corresponds to a one or a zero bit. Convolutional FEC codes work on bit or symbol streams of arbitrary length. Convolutional codes are typically decoded using soft-decision algorithms like the Viterbi, MAP or BCJR algorithms that process (discretized) analog signals, and which allow for much higher error-correction performance than hard-decision decoding. Convolutional FEC codes are most often soft decoded with the Viterbi algorithm, though other algorithms can be used. Viterbi decoding allows asymptotically optimal decoding efficiency with increasing constraint length of the convolutional code, but at the expense of exponentially increasing complexity. A convolutional code that is terminated is also a block code in that it encodes a block of input data, but the block size of a convolutional code is generally arbitrary, while block codes have a fixed size dictated by their algebraic characteristics. Types of termination for convolutional codes include tail-biting and bit-flushing. Some other non-limiting examples of FEC techniques include turbo coding, low density parity check (LDPC), interleaving, and local decoding. Many FEC coders (but not all) can also generate a bit-error rate (BER) signal which can be used as feedback to fine-tune the analog receiving electronics.

"Ground" is used more in an electrical/electromagnetic sense and generally refers to the Earth's surface including land and bodies of water, such as oceans, lakes, and rivers.

"Ground-wave Propagation" generally refers to a transmission method in which one or more electromagnetic waves are conducted via the boundary of the ground and atmosphere to travel along the ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those. The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending upon a number of factors including solar activity, such as sunspots.

"Jitter" generally refers to a variable delay in the receipt of a transmitted message. For example, jitter arises as messages arrive at an input at varying intervals, and as a result, the receiver of the message has to wait a variable time before a data slot is available for message transport.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$latency_{low} \leq \frac{d}{c} \cdot k$$

where:
d=distance (miles)
c=the speed of light in a vacuum (186,000 miles/sec)
k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$latency_{high} > \frac{d}{c} \cdot k$$

where:
d=distance (miles)
c=the speed of light in a vacuum (186,000 miles/sec)
k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the earth using skywave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Message" generally refers to a discrete unit of communication intended by a source for consumption by a recipient or group of recipients.

"Modem" or "Modulator-Demodulator" generally refers to a device, such as an electronic circuit and/or computer, that performs the functions of modulation and demodulation of a signal such as through a modulator and a demodulator.

"Modulation" generally refers to the process of varying one or more properties of a periodic waveform, called the carrier signal, with a modulating signal that typically contains information to be transmitted.

"Modulator" generally refers to a device, such as an electronic circuit and/or computer, that varies one or more properties of a periodic waveform, called the carrier signal, with a modulating signal that typically contains information to be transmitted. For example, these properties of the waveform can include amplitude, frequency, phase, and harmonics as well as other properties. By way of a non-limiting example, the modulator can control the parameters of a high-frequency electromagnetic information carrier in accordance with electrical signals of the transmitted message. One or more modulators can be integrated with one or more demodulators to form a modulator-demodulator (modem). As such, the term modulator may further refer to one or more parts, components, and/or software that functions as a modulator within a modem.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Non-skywave propagation" generally refers to all forms of transmission, wired and/or wireless, in which the information is not transmitted by reflecting an electromagnetic wave from the ionosphere.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core. Optical fibers are generally constructed of dielectric material that is not electrically conductive but is substantially transparent. Such materials may or may not include any combination of extruded glass such as silica, fluoride glass, phosphate glass, Chalcogenide glass, or polymeric material such as various types of plastic, or other suitable material and may be configured with any suitable cross-sectional shape, length, or dimension. Examples of electromagnetic energy that may be successfully passed through optical fibers include electromagnetic waves in the near-infrared, mid-infrared, and visible light portion of the electromagnetic spectrum, although electromagnetic energy of any suitable frequency may be used.

"Optimum Working Frequency" generally refers to the frequency that provides the most consistent communication path via sky-wave propagation. It can vary over time depending on number of factors, such as ionospheric conditions and time of day. For transmissions using the F2 layer of the ionosphere the working frequency is generally around 85% of the MUF, and for the E layer, the optimum working frequency will generally be near the MUF.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted substantially vertically, and a different polarization when mounted substantially horizontally. As a transverse wave, the magnetic field of a radio wave is at right angles to that of the electric field, but by convention, talk of an antenna's "polarization" is understood to refer to the direction of the electric field. Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location. Matching the receiving antenna's polarization to that of the transmitter may be especially important in ground wave or line-of-sight propagation but may be less important in skywave propagation. An antenna's linear polarization is generally along the direction (as viewed from the receiving location) of the antenna's currents when such a direction can be defined. For instance, a vertical whip antenna or Wi-Fi antenna vertically oriented will transmit and receive in the vertical polarization. Antennas with horizontal elements, such as most rooftop TV antennas, are generally horizontally polarized (because broadcast TV usually uses horizontal polarization). Even when the antenna system has a vertical orientation, such as an array of horizontal dipole antennas, the polarization is in the horizontal direction corresponding to the current flow. Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) as discussed above, and circular polarization (in which the two axes of the ellipse are equal). In linear polarization the electric field of the radio wave oscillates back and forth along one direction; this can be affected by the mounting of the antenna but usually the desired direction is either horizontal or vertical polarization. In circular polarization, the electric field (and magnetic field) of the radio wave rotates at the radio frequency circularly around the axis of propagation.

"Primary Communication Channel" or "Primary Channel" generally refers to a communication pathway that is a first choice for transferring information. Typically, but not always, the primary communication channel has one or more properties, such as latency or bandwidth, that is desirable over others. For example, a primary communication channel can have the highest data rate of all the channels sharing a common interface. A primary communication channel may support the transfer of information in one direction only, either direction alternately, or both directions simultaneously. The primary communication channel can for example include wired and wireless forms of communication.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. A processor also includes an Application-Specific Integrated Circuit (ASIC). An ASIC is an Integrated Circuit (IC) customized to perform a specific series of logical operations in controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). An FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Pseudorandom Binary Sequence" or "PRBS" generally refers to a binary sequence generated with a deterministic algorithm that is difficult to predict and exhibits statistical behavior similar to a truly random sequence.

"Radio" generally refers to electromagnetic radiation in the frequencies that occupy the range from 3 kHz to 300 GHz.

"Radio horizon" generally refers to the locus of points at which direct rays from an antenna are tangential to the ground. The radio horizon can be approximated by the following equation:

$$d \cong \sqrt{2h_t} + \sqrt{2h_r}$$

where:
d=radio horizon (miles)
$h_t$=transmitting antenna height (feet)
$h_r$=receiving antenna height (feet).

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Satellite Communication" or "Satellite Propagation" generally refers to transmitting one or more electromagnetic signals to a satellite which in turn reflects and/or retransmits the signal to another satellite or station.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units. For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Skip distance" generally refers to the minimum distance from a transmitter to where a wave from skywave propagation can be returned to the Earth. To put it another way, the skip distance is the minimum distance that occurs at the critical angle for sky-wave propagation.

"Skip Zone" or "Quiet Zone" generally refers to an area between the location where a ground wave from ground wave propagation is completely dissipated and the location where the first skywave returns using skywave propagation. In the skip zone, no signal for a given transmission can be received.

"Skywave Propagation" refers generally to a transmission method in which one or more electromagnetic-waves radiated from an antenna are refracted from the ionosphere back to the ground. Skywave propagation further includes tropospheric scatter transmissions. In one form, a skipping method can be used in which the waves refracted from the ionosphere are reflected by the ground back up to the ionosphere. This skipping can occur more than once.

"Space-wave Propagation" or sometimes referred to as "Direct Wave Propagation" or "Line-of-sight Propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about 4/5 greater than the geometric line of sight.

"Spread Spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the earth's atmosphere extending from the troposphere to about 25 to 35 miles above the earth surface.

"Symbol" generally refers to a waveform, a state or a significant condition of the communication channel that persists, for a fixed period of time. For digital baseband transmissions, a symbol may be in the form of a pulse, and a symbol may be in the form of a tone in passband transmissions using modems. A transmitter or other device places symbols on one or more channels, and the receiver detects the sequence of symbols in order to reconstruct the transmitted data. In some cases, there may be a direct correspondence between a symbol and a small unit of data. For instance, each symbol can encode one or several bits. The data may also be represented by the transitions between symbols, and/or by a sequence of several symbols.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transfer Rate" generally refers to the rate at which something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission Line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line. Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to a path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-sight, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmission Time" generally refers to is the amount of time from the beginning until the end of a message transmission in a communication network. In the case of a digital message, the transmission time is the time from the first bit until the last bit of a message has left the transmitting node. For a digital packet, the packet transmission time can be obtained from the packet size and bit rate. The transmission time should not be confused with propagation delay which refers to the time it takes for the first bit to travel from a sender to a receiver. "Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the earth's atmosphere. The troposphere extends about 11 miles above the surface of the earth in the mid-latitudes, up to 12 miles in the tropics, and about 4.3 miles in winter at the poles.

"Tropospheric Scatter Transmission" generally refers to a form of skywave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | communication system |
| 105 | information source |
| 110 | information destination |
| 115 | communication channels |
| 120 | primary communication channel |
| 125 | backend communication channel |
| 130 | distance |
| 135 | primary channel latency |
| 140 | primary channel bandwidth |
| 145 | backend channel latency |
| 150 | backend channel bandwidth |
| 200 | communication system |
| 204 | low latency, low bandwidth communication link |
| 206 | HF radio channel |
| 208 | high latency, high bandwidth communication link |
| 212 | first communication node |
| 214 | transmission station |
| 216 | second communication node |
| 218 | receiving station |
| 220 | atmosphere |
| 224 | electromagnetic waves |
| 228 | transmitting antenna |
| 232 | receiving antenna |
| 236 | transmission line |
| 240 | transmission line |
| 244 | transmission line |
| 252 | repeaters |
| 256 | earth |
| 260 | client |
| 264 | connection |
| 266 | wireless connection |
| 268 | instruction processor |
| 272 | connection |
| 405 | modulator |
| 410 | radio transmitter |
| 415 | fiber optic transmitter |
| 420 | fiber optic cable |
| 425 | demodulator |
| 430 | radio receiver |
| 435 | fiber optic receiver |
| 500 | communication system |
| 505 | high speed transmitter data network |
| 510 | high speed receiver data network |
| 600 | transmitter system |
| 605 | high frequency trading network |
| 610 | user data |
| 615 | transmission acknowledgement data |
| 620 | transmitted data |
| 700 | diagram |
| 705 | time |
| 710 | user data packets |
| 715 | user messages |
| 720 | fill data |
| 725 | high speed network packet transmission time |
| 730 | radio frequency channel message transmission time |
| 735 | inter-message transmission time |
| 800 | flowchart |
| 805 | stage |
| 810 | stage |
| 815 | stage |
| 820 | stage |
| 825 | stage |
| 830 | stage |
| 900 | diagram |
| 905 | stage |
| 910 | stage |
| 915 | stage |
| 920 | stage |
| 925 | stage |
| 930 | stage |
| 935 | stage |
| 1000 | fill data generation system |
| 1005 | PRBS source |
| 1010 | receive FEC decoder |
| 1015 | receive CRC detector |
| 1100 | diagram |

-continued

| Reference Numbers | |
|---|---|
| 1105 | stage |
| 1110 | stage |
| 1115 | stage |
| 1120 | stage |
| 1125 | stage |
| 1130 | stage |

What is claimed is:

1. A method, comprising:
receiving fill data in a message data stream from a primary communication channel at a receiving station;
maintaining a signal lock on the message data stream through the fill data:
receiving a message in the data stream from the primary communication channel at the receiving station;
detecting a message boundary of the message through a parity check code in combination with an error correction scheme;
wherein the fill data received at the receiving station is configured to fail the parity check code and the error correction scheme;
wherein the detecting the message boundary includes determining the fill data fails the parity check code and the error correction scheme;
wherein the message received at the receiving station is configured to pass the parity check code and the error correction scheme; and
wherein the detecting the message boundary includes determining that the message passes the parity check code and the error correction scheme.

2. The method of claim 1, wherein the primary communication channel includes a low bandwidth, low latency communication link.

3. The method of claim 2, wherein the primary communication channel includes a high frequency radio channel.

4. The method of claim 1, wherein message in the data stream includes user data.

5. The method of claim 4, wherein the user data is encoded in an asynchronous manner in the message data stream.

6. The method of claim 4, wherein the fill data includes a pseudorandom binary sequence (PRBS).

7. The method of claim 6, wherein the fill data includes a version of the PRBS modified by the parity check code and the error correction scheme.

8. The method of claim 7, further comprising:
detecting a false message with the version of the PRBS.

9. The method of claim 1, wherein the parity check code includes a checksum.

10. The method of claim 1, wherein the parity check code includes a cyclic redundancy check (CRC).

11. The method of claim 1, wherein the error correction scheme includes forward error correction (FEC).

12. The method of claim 1, wherein the error correction scheme includes a convolution code scheme.

13. The method of claim 12, wherein the error correction scheme includes a tail- biting Viterbi decoding algorithm.

14. The method of claim 1, wherein the error correction scheme includes a block code scheme.

15. The method of claim 14, wherein the error correction scheme includes a turbo block code scheme.

16. A method, comprising:
encoding a message data stream with user data and fill data;
modifying the user data to pass a parity check code in combination with an error correction scheme; and
modifying the fill data to fail the parity check code in combination with error correction scheme to reduce a chance of false message detection.

17. A method, comprising:
converting a first user data packet to a first user message for transmission over a primary communication channel from a transmission station;
wherein the first user message isa longer than the first user data packet;
transmitting the first user message from the tansmission station over the primary communication channel;
receiving a second user packet at the transmission station;
determining transmission of the first user message over the primary communication channel is in process;
calculating a message transmission time of the second user data packet over the primary communication channel;
calculating an inter-message transmission time;
wherein the inter-message transmission time represents a cut-off time wherein the primary communication channel is faster than a backend communication channel;
wherein the primary communication channnel has lower bandwidth and latency than the backend communication channel; and
determining not to transmit the second user data over the primary communication channel when the message transmission time is longer the inter-message transmission time.

18. The method of claim 17, further comprising:
sending a second user message containing the second user data packet over the backend communication channel; and
sending fill data over the primary communication channel once transmission of the first user message concludes.

19. The method of claim 17, further comprising:
receiving the second user data packet at the transmission station from a high frequency trading network; and
sending an alert to the high frequency trading network that the second user data was not sent over the primary communication channel.

20. The method of claim 1, wherein:
the fill data includes a pseudorandom binary sequence (PRBS); and
the message lacks any symbol designating a fixed framing structure.

21. The method of claim 20, further comprising:
wherein the message concerns a financial transaction; and
executing the financial transaction based on the message.

22. The method of claim 16, wherein:
the fill data includes a pseudorandom binary sequence (PRBS);
the parity check code includes a cyclic redundancy check (CRC); and
the error correction scheme includes forward error correction (FEC).

23. The method of claim 22, wherein:
the user data lacks any symbol designating a fixed framing structure; and
the user data concerns a financial transaction.

* * * * *

UNITED STATES PATENT AND TRADEMARK OFFICE
CERTIFICATE OF CORRECTION

| | | |
|---|---|---|
| PATENT NO. | : 11,929,829 B2 | Page 1 of 1 |
| APPLICATION NO. | : 17/659563 | |
| DATED | : March 12, 2024 | |
| INVENTOR(S) | : Babich et al. | |

It is certified that error appears in the above-identified patent and that said Letters Patent is hereby corrected as shown below:

In the Claims

Column 35, Claim 1, Line 17, replace "through the fill data:" with --through the fill data;--

Column 35, Claim 1, Line 27, replace "determining the fill data fails the parity check code and" with --determining that the fill data fails the parity check code and--

Column 36, Claim 17, Line 13, replace "wherein the first user message isa longer than the first user" with --wherein the first user message is longer than the first user--

Column 36, Claim 17, Line 15, replace "transmitting the first user message from the tansmission" with --transmitting the first user message from the transmission--

Column 36, Claim 17, Line 17, replace "receiving a second user packet at the transmission station;" with --receiving a second user data packet at the transmission station;--

Column 36, Claim 17, Line 25, replace "cut-off time wherein the primary communication chan-" with --cut-off time where the primary communication chan- --

Column 36, Claim 17, Line 27, replace "wherein the primary communication channnel has lower" with --wherein the primary communication channel has lower--

Signed and Sealed this
Seventh Day of May, 2024

*Katherine Kelly Vidal*

Katherine Kelly Vidal
*Director of the United States Patent and Trademark Office*